United States Patent
Williams et al.

(10) Patent No.: US 6,721,951 B1
(45) Date of Patent: *Apr. 13, 2004

(54) DATA TRANSFER UTILIZING SINGLE FUNCTIONALLY INDEPENDENT DATA TRANSFER MECHANISM

(75) Inventors: Antony S. Williams, Redmond, WA (US); Robert G. Atkinson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/258,039

(22) Filed: Feb. 25, 1999

Related U.S. Application Data

(63) Continuation of application No. 08/632,307, filed on Apr. 15, 1996, now Pat. No. 5,911,066.

(51) Int. Cl.[7] .................................................. G06F 9/46
(52) U.S. Cl. ........................ 719/329; 719/319; 719/320; 719/328
(58) Field of Search ................................ 709/100, 101, 709/102, 103, 104, 310; 717/162; 719/319, 320, 328, 329

(56) References Cited

U.S. PATENT DOCUMENTS

| | | | |
|---|---|---|---|
| 5,157,763 A | * 10/1992 | Peters et al. ............... 345/769 |
| 5,187,787 A | 2/1993 | Skeen et al. | |
| 5,257,369 A | 10/1993 | Skeen et al. | |
| 5,261,080 A | 11/1993 | Khoyi et al. | |
| 5,303,379 A | 4/1994 | Khoyi et al. | |
| 5,333,298 A | 7/1994 | Bland et al. | |
| 5,392,390 A | 2/1995 | Crozier | |

OTHER PUBLICATIONS

"Transfer Class," *Penpoint Architectural Reference*, GO Corporation, vol. II, Part 9, chapter 83, pp. 165–178 (Jun. 1992).
*Technical Introduction to the Macintosh Family*, Apple Computer, Inc., Addison–Wesley Publishing Company, Inc., Menlo Park, California, 1987, pp. 63–66.
Garfinkel, S. and Michael Mahoney, *NeXTSTEP Programming: Step One: Object–Oriented Applications*, Springer–Verlag, New York, 1993, pp. 511–531.
Carr, R. and Dan Shafer, *The Power of PenPoint*, Addison–Wesley Publishing Company, Inc., Menlo Park, California, 1991, pp. 1–19 and 129–151.
*Inside Macintosh, vol. 1*, Apple Computer, Inc., Addison–Wesley Publishing Company, Inc., Menlo Park, California, 1985, pp. 451–464.
Petzold, C., *Programming Windows*, Microsoft Press, Redmond, Washington, 1990, pp. 777–807.
*Microsoft Windows Software Development Kit: Programmer's Reference, vol. 1: Overview*, Microsoft Corporation, 1992, pp. 206–212.

(List continued on next page.)

*Primary Examiner*—Majid A. Banankhah
(74) *Attorney, Agent, or Firm*—Klarquist Sparkman, LLP

(57) ABSTRACT

An improved data transfer mechanism is provided. In a preferred embodiment of the present invention, a uniform data transfer mechanism is used by each computer program performing data transfer. The uniform data transfer mechanism of the preferred embodiment of the present invention provides a communication mechanism and a flexible and robust interface to support all existing and future data transfer applications.

7 Claims, 19 Drawing Sheets

OTHER PUBLICATIONS

*Microsoft Windows Software Development Kit: Programmer's Reference, vol. 2: Functions*, Microsoft Corporation, 1992, pp. 668, 670–672, 679–680, 685–686, 688–689, 695–698, 712–713, 722.

*Microsoft Windows Software Development Kit, vol. 1, Version 3.0 for the MS–DOS and PC–DOS Operating Systems*, Microsoft Corporation, 1990, pp. 1–58, 1–59, 4–28, 4–29, 4–110, 4–111, 4–116, 4–117, 4–156, 4–157, 4–158, 4–159, 4–264, 4–265, 4–320, 4–321, 4–346, 4–347, 4–368, 4–369, 4–370, 4–371, 4–372, 4–373, 6–98, 6–99.

*Microsoft Windows Software Development Kit, vol. 2, Version 3.0 for the MS–DOS and PC–DOS Operating Systems*, Microsoft Corporation, 1990, pp. 9–5, 9–6, Chapter 15.

*Microsoft Windows Software Development Kit, Guide to Programming, Version 3.0 for the MS–DOS and PC–DOS Operating Systems*, Microsoft Corporation, 1990, Chapters 13 and 22.

Deitel, Harvey M., An Introduction to Operating Systems, Second Edition, Addison–Wesley Publishing Company, Inc., 1990, pp. 583–585.

\* cited by examiner

DATA TRANSFER UTILIZING SINGLE FUNCTIONALLY INDEPENDENT DATA TRANSFER MECHANISM

This application is a continuation of U.S. application Ser. No. 08/632,307, filed Apr. 15, 1996, now U.S. Pat. No. 5,911,066, which is a continuation of U.S. patent application Ser. No. 08/199,853, filed Feb. 22, 1994, which is now abandoned.

TECHNICAL FIELD

The present invention relates generally to data processing systems and, more particularly, to a uniform mechanism for transferring data within a data processing system.

BACKGROUND OF THE INVENTION

In conventional computer systems, data transfer is application specific. In other words, a computer program is responsible for handling the data transfer that is required by an application of data transfer functionality ("application"). Two examples of such applications of data transfer functionality are drag-and-drop and cut-and-paste. Drag-and-drop refers to when a computer user selects data contained within a data source and moves the mouse to a data sink while keeping the mouse button depressed. The data source and the data sink are computer programs within the computer system which contain or accept data. An example of a data source or data sink is a file editor or a word processing document. When the indicator on the computer display, which reflects mouse movement ("mouse pointer"), appears to be pointing to the data sink, the user releases the depressed mouse button and the selected data appears to be inserted into the dam sink. Cut-and-paste refers to when a computer user selects data from within a data source and performs a cut operation (typically invoked through a pull-down menu). The computer user then selects a position in the data sink and performs a paste operation (typically invoked through a pull-down menu). The result of a cut-and-paste application is that data is extracted from the data source and is inserted into the data sink. In order to understand how a data sink and a data source handle the drag-and-drop and cut-and-paste applications, drag-and-drop and cut-and-paste are examined in more detail below.

FIG. 1 depicts a conventional computer system for performing a drag-and-drop application. The memory 102 of the computer system contains a data source 104, which contains data 110; a global memory 108; a window manager 112 and a data sink 106. The global memory 108 is an area of memory that is accessible to all computer programs in a state of operation. Global memory may be contrasted against local memory wherein local memory is memory local to the computer program (i.e., within the address space of the computer program). The window manager 112 is a computer program responsible for performing all computer display-related operations. FIG. 2 depicts a flowchart of the steps performed by a conventional computer system for performing a drag-and-drop application. When a drag-and-drop application is performed, the computer user first selects the data 110 within the data source 104 by typically using a mouse or other pointing device (step 202). Selecting data refers to highlighting data 110 within the data source 104. The computer user then drags the selected data 110 to the data sink 106 (step 204). Dragging refers to the computer user (hereafter "user") depressing the mouse button, while the mouse pointer is positioned on the selected data 110, and moving the mouse while keeping the mouse button depressed. After the user drags the data 110 to the data sink 106, the data source 104 converts the data 110 into a format acceptable to the global memory 108 and passes the data 110 to the window manager 112 (step 206). When the data 110 is passed to the window manager 112, the window manager 112 stores the data 110 into the global memory 108. After storing the data 110 into the global memory 108, the window manager 112 transfers the data 110 from the global memory 108 to the data sink 106 (step 208). Upon receiving the data 110, the data sink 106 converts the data 110 into a format acceptable to the data sink 106 (step 210).

The cut and paste application is similar to the drag and drop application in that a data sink and a data source performing the cut and paste application also form a connection and transfer data. FIG. 3 depicts a conventional computer system for performing the cut-and-paste application. The memory 102 of the computer system contains a data source 104, which contains data 110; a clipboard 302; and a data sink 106. The clipboard 302 is responsible for maintaining an area of global memory used for temporary storage. During a cut-and-paste application, the user selects data 110 from the data source 104, invokes a cut operation (typically by using a pull-down menu), inserts the cursor into the data sink 106 and invokes the paste operation (typically by using a pull-down menu). Both the cut and the paste operations are provided by the clipboard 302 and are well known in the computer industry. FIG. 4 depicts a flowchart of the steps performed by a conventional computer system for performing the cut-and-paste application. First, the user selects data 110 from the data source 104 and performs a cut operation (step 402). The data 110 is then converted into a format acceptable to the clipboard 302 (step 404). After the data 110 has been converted, the data 10 is copied to the clipboard 308, wherein the data 110 then resides within global memory (step 406). Then, the user selects a location within the data sink 106 and invokes the paste operation (step 408). The data sink 106 transfers the data 110 from the clipboard 302 to the location in the data sink 106 selected by the user (step 410).

As indicated above, in both the cut-and-paste and the drag-and-drop applications, the data source and the data sink form a logical connection through either the clipboard 302 or the window manager 112. Then, after the connection is established, the data 110 is transferred. This two-step process requires the developers of computer programs which perform applications of data transfer functionality to create, for each application, both a connection component to establish a connection and a data transfer component to perform the data transfer. Thus, the developers of computer programs which support applications of data transfer functionality must implement a data transfer component for every application supported.

SUMMARY OF THE INVENTION

In accordance with a first aspect of the present invention, a method is executed in a computer system. In accordance with this method of the first aspect of the present invention, the computer has a connection mechanism, a uniform data transfer mechanism and a plurality of computer programs. In order to perform data transfer between two computer programs, this method establishes a connection between the computer programs transferring data and invokes the uniform data transfer mechanism to perform the data transfer.

In accordance with a second aspect of the present invention, a communication mechanism is provided that contains a connection component and a data transfer component. The data transfer component further contains a GetData component, a GetDataHere component, a QueryGetData component, a GetCanonicalFormat component, a SetData component, a EnumFormat component, an Advise component, an UnAdvise component and an EnumAdvise component.

DETAILED DESCRIPTION OF THE INVENTION

The preferred embodiment of the present invention provides for a uniform data transfer mechanism that may be used by any computer program to transfer data. Thus, the code that implements this mechanism may be reused by multiple computer programs and these computer programs need not include their own code to handle data transfer. In addition, within a computer program that performs many applications of data transfer functionality, the computer program needs only to use one data transfer mechanism. Thus, computer programs only need to implement the connection component associated with data transfer applications. The preferred embodiment also provides a robust and flexible interface into the uniform data transfer mechanism so that computer programs may make easy and efficient use of the uniform data transfer mechanism.

Figure 1:
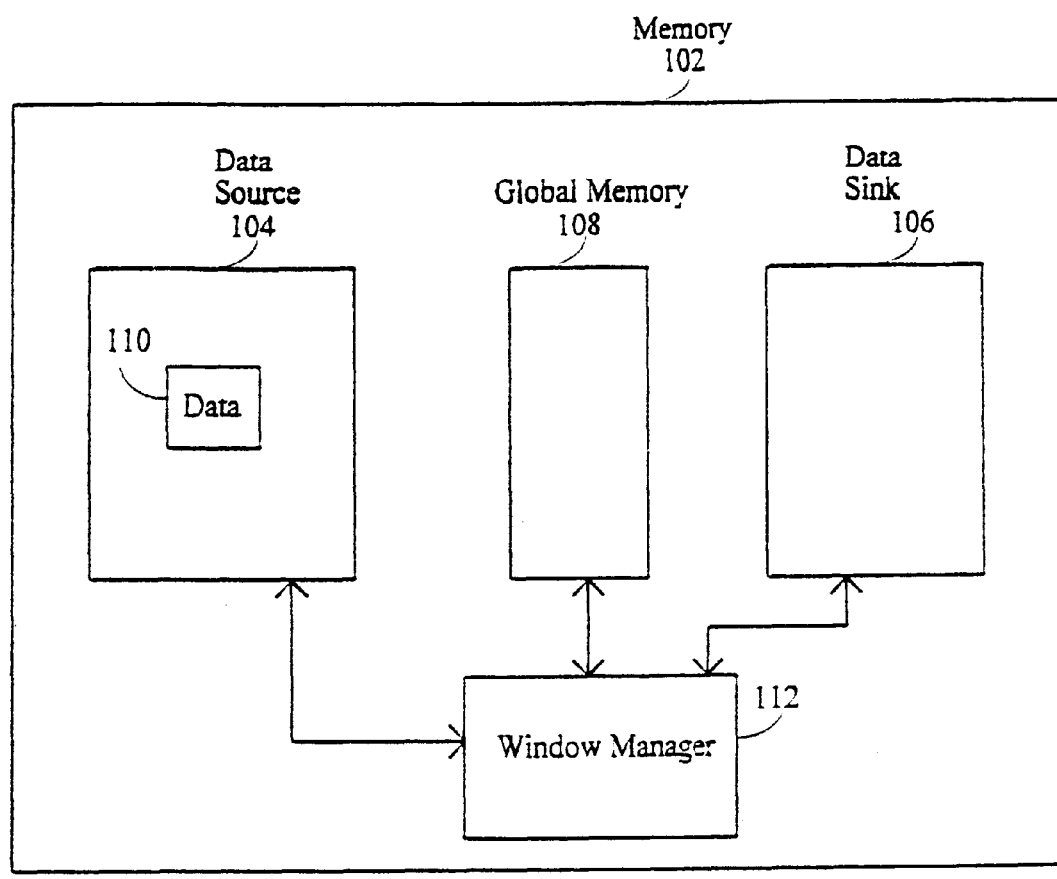
FIG. 1 depicts a conventional computer system for performing a drag-and-drop application.
Figure 2:
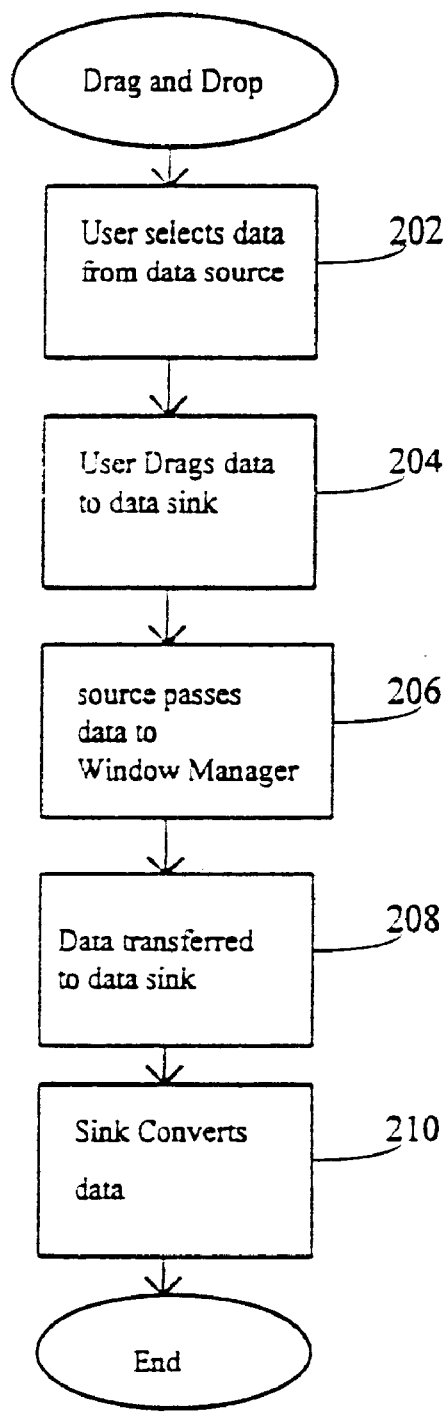
FIG. 2 depicts a flowchart of the steps performed by a conventional computer system for performing a drag-and-drop application.
Figure 3:
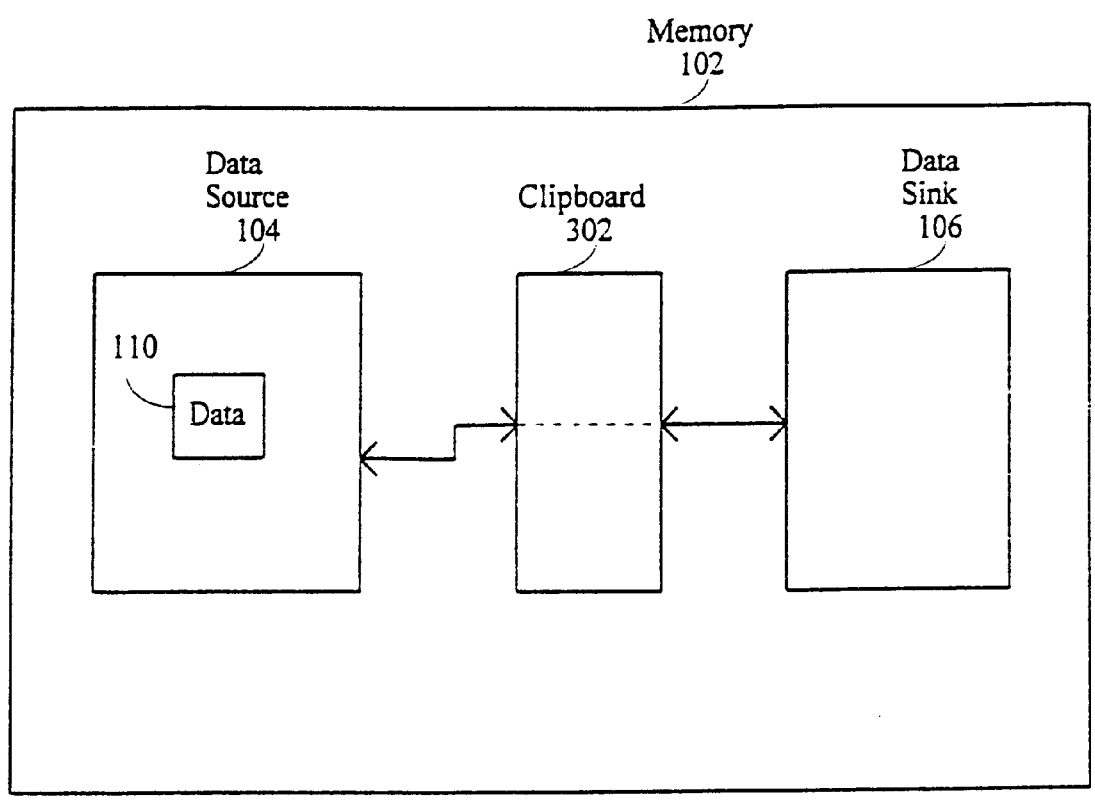
FIG. 3 depicts a conventional computer system for performing a cut-and-paste application.
Figure 4:
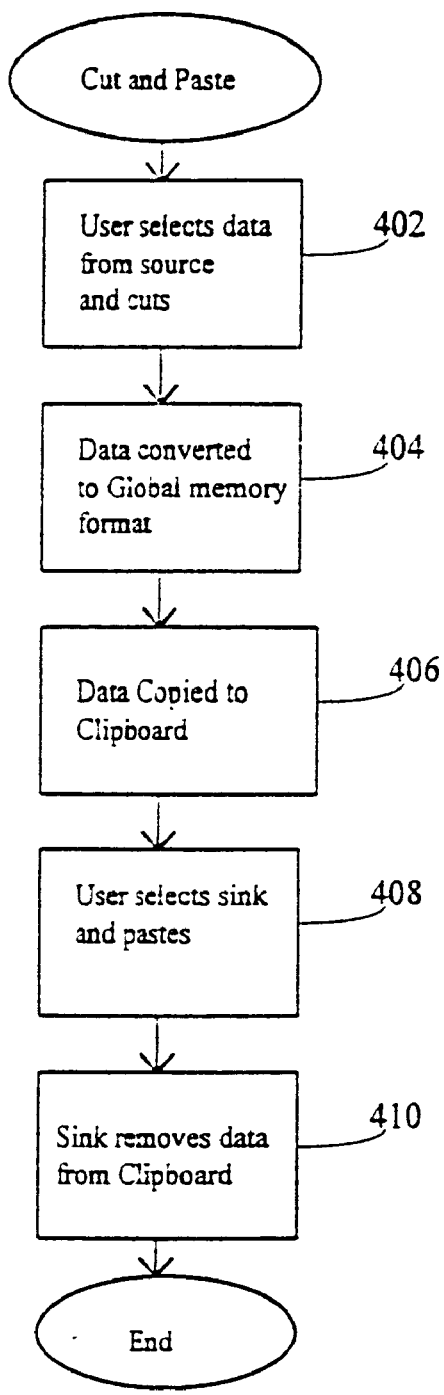
FIG. 4 depicts a flowchart of the steps performed by a conventional computer system for performing a cut-and-paste application.
Figure 5:
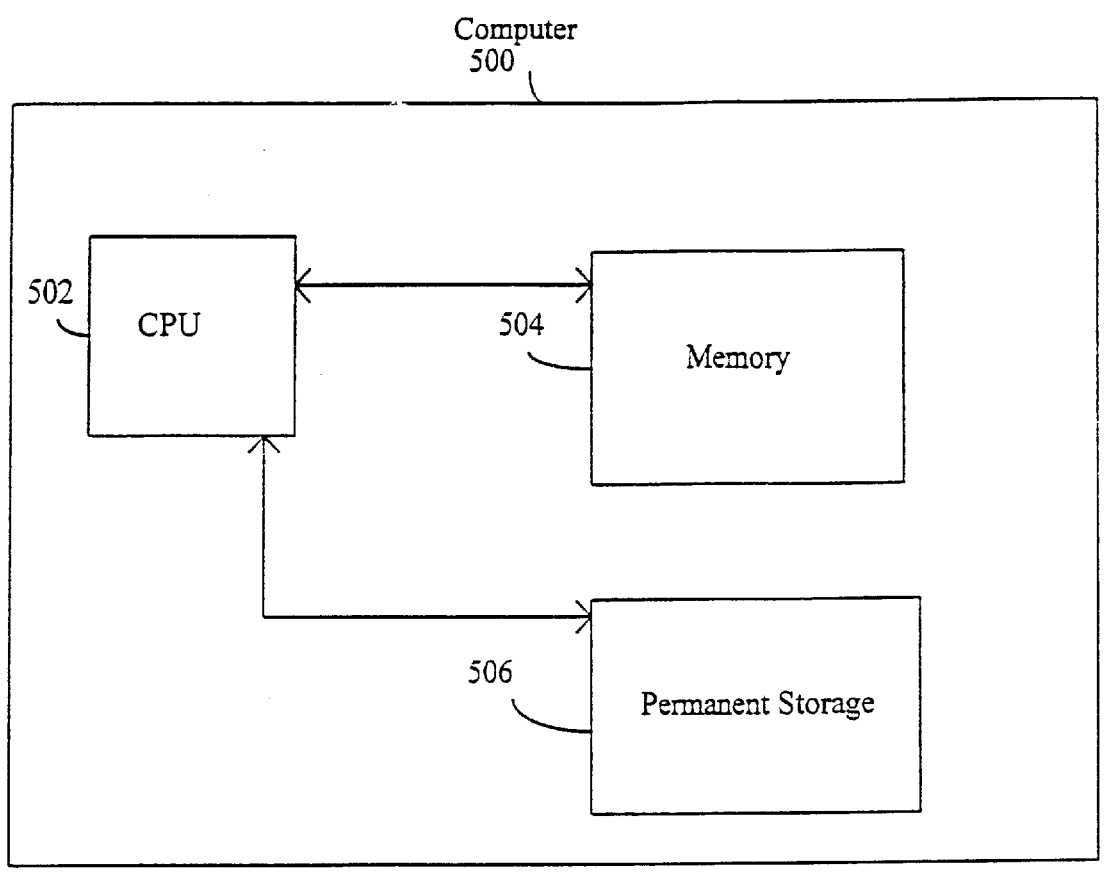
FIG. 5 depicts a computer suitable for practicing the preferred embodiment of the present invention.

FIG. 5 depicts a computer suitable for practicing the preferred embodiment of the present invention. The computer 500 contains a central processing unit (CPU) 502, a memory 504 and a permanent storage device 506. Those skilled in the art will appreciate that the computer 500 may also include additional components. The CPU 502 is responsible for transferring computer programs between the permanent storage 506 and the memory 504, and executing the computer programs once resident within the memory 504. The permanent storage device 506 is a non-volatile storage device for storing information in between invocations of the computer system. Although the preferred embodiment of the present invention is described as being used on a single computer system, one skilled in the art will appreciate that the preferred embodiment can be used on a distributed system wherein each computer is connected by a local area network or a wide area network.

The preferred embodiment of the present invention is designed to operate in an object-oriented environment, such as an environment that supports the Microsoft OLE 2.0 ("OLE") protocol established by Microsoft Corporation of Redmond, Wash. The environment in which the preferred embodiment of the present invention is practiced follows an underlying component object model. An object is a logical structure that includes data structures for holding data and may include functions that operation on the data held in the data structures. An object may hold just data and not include code for manipulating the data. An object is a useful structure for encapsulating data and behavior into a single logical entity.

Objects are organized into "classes." An object class is a group of objects with similar properties and common behavior. Each object is a member of a class and constitutes an instance of the object class. All members of a class include at least the properties defined for the object class, but the value of these properties may vary among the objects of the object class.

Another concept exploited in the preferred embodiment of the present invention is the notion of an "interface." An interface is a named set of logically related functions ("methods"). An interface lists signatures (such as parameters) for a set of methods. For instance, an example interface may define the signatures for various methods that are used to display an object on a video display. An interface does not provide code for implementing the methods; rather, the code for implementing the methods is provided by objects. Objects that provide the code for implementing the methods of an interface are said to "support" the interface. The code provided by an object that supports an interface must comply with the signatures provided within the interface. In the C++ programming language, an interface constitutes a set of virtual functions. Although the preferred embodiment of the present invention is described as being implemented in an object-oriented environment, those skilled in the art will appreciate that the present invention may also be practiced in non-object-oriented environments as well.

Figure 6:
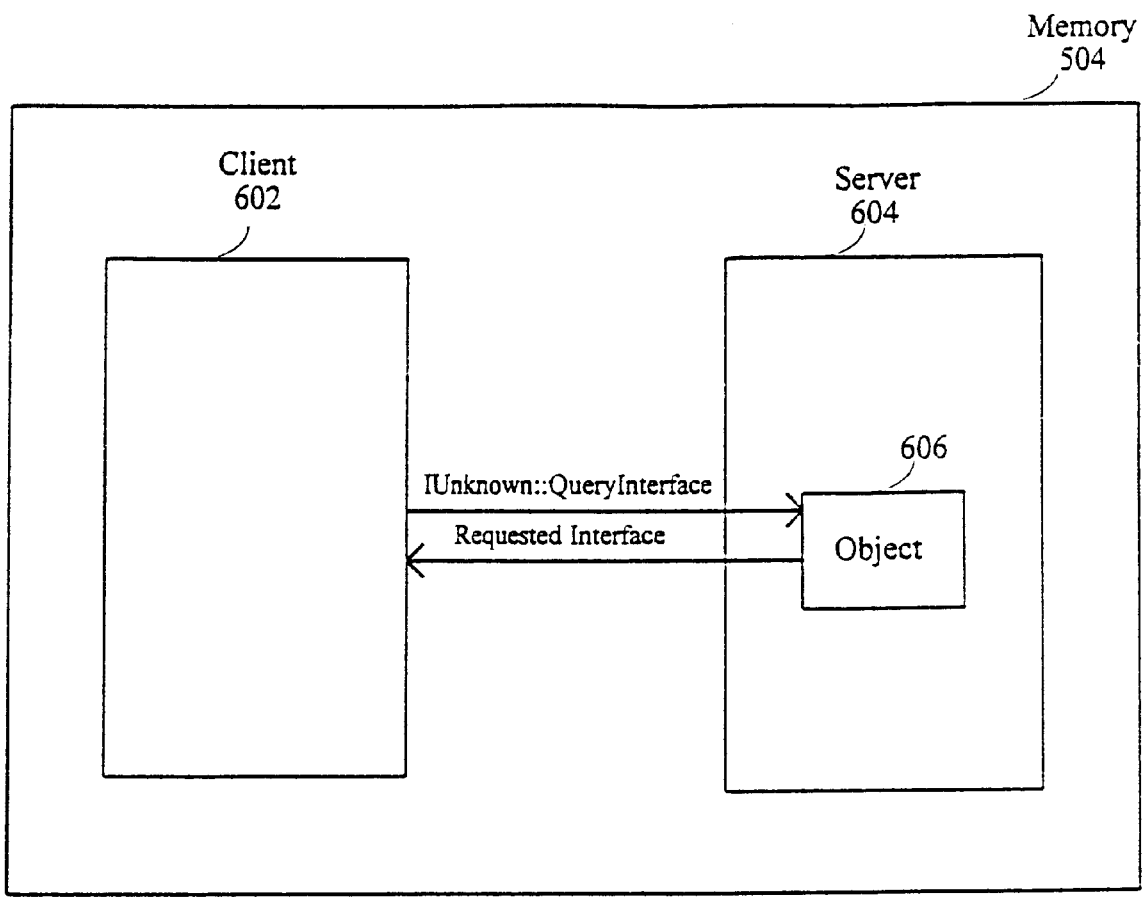
FIG. 6 depicts a component object model used in the preferred embodiment of the present invention.

The basic concepts of the component object model may be explained relative to the block diagram of FIG. 6. The memory 504 of the computer contains a client 602 and a server 604. The client 602 and the server 604 are computer programs in a state of operation. The server 604 contains an object 606. The client 602 uses an interface provided by the object 606 to manipulate the object 606. The client 602 does not know of the implementation of the object 606 or the server 604. Only the server 604 knows of the implementation of the object 606 and how to manipulate the object 606. Since the client 602 does not know the implementation of the object, the client 602 is data independent. Data independence allows the developer of the client 602 to write code which will allow for the support of new types of data and interactions with new computer programs without having to change the code of the client 602. Since the internal representation of the object 606 is hidden from the client 602, the client 602 manipulates the object through the use of an "interface."

All objects in the component object model are required to support the IUnknown interface. Since all objects support the IUnknown interface, when a client 602 wishes to manipulate an object 606, the client 602 first accesses the IUnknown interface in order to access the interface that provides the appropriate methods to perform the desired manipulation. One method contained within the IUnknown interface is the QueryInterface method. The client 602 uses the QueryInterface method of the IUnknown interface to obtain a pointer to a desired interface from the object 606. If the object 606 supports the requested interface, the object 606 returns a pointer to the requested interface to the client 602. After receiving a pointer to the requested interface, the client 602 can directly manipulate the object 606 using the methods contained in the requested interface. Since the client 602 does not know of the implementation of the methods nor does the client 602 know of the internal representations of the object 606, the code of the client 602 is flexible and can support new forms of objects without having to change because the code of the client 602 is data independent.

Consider an example where a client 602 is a word processing document, a server 604 is a spreadsheet program, and an object 606 is a range of cells within the spreadsheet program. Thus, by using the component object model, the object 606 may appear as part of the client 602 to the user and may be manipulated by the user while using the client 602. The user may modify the cells in the object 606 by using the client 602, and the client 602 invokes the methods that implement the modifications in order to manipulate the object 606.

The preferred embodiment of the present invention provides a uniform data transfer mechanism ("UDT"). The UDT provides a mechanism and interface to computer programs so that the computer programs may transfer data in a uniform manner after a connection is established. Thus, the developers of computer programs which perform applications of data transfer functionality using UDT only implement a connection component for each application, not the data transfer component. As a result, the computer programs are easier to implement. Since the preferred embodiment is designed for use with all applications of data transfer functionality, the preferred embodiment provides a robust interface to support all existing applications as well as future applications.

Figure 7:
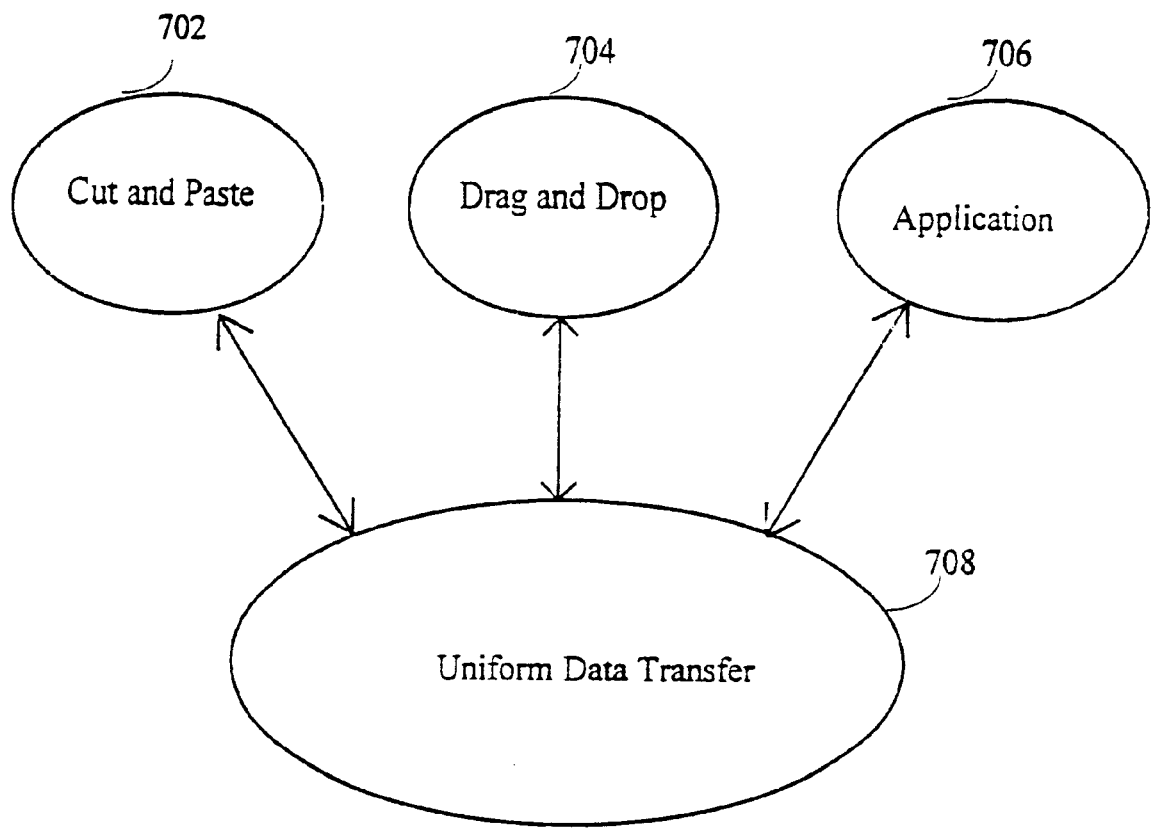
FIG. 7 depicts a functional diagram of the uniform data transfer mechanism of the preferred embodiment of the present invention.

FIG. 7 depicts a functional diagram of UDT of the preferred embodiment of the present invention. The preferred embodiment of the present invention uses UDT 708 to provide a uniform mechanism for transferring data for any application of data transfer functionality. Examples of such applications are a cut-and-paste application 702, a drag-and-drop application 704 and, more generally, other applications 706 which transfer data.

As mentioned above, the preferred embodiment of the present invention provides interfaces for facilitating UDT. For purposes of explaining how the UDT mechanism works, the major interfaces that are provided will be described in more detail below. The preferred embodiment of the present invention provides a DLL that provides an IDataObject Interface. The IDataObject interface groups several methods that are useful to an object that transfers data. Upon receipt of a pointer to the IDataObject interface, the client may use UDT 708.

In the IDataObject interface, the FORMATETC structure is used in many methods. The FORMATETC structure is used to request or define the format and aspect ("characteristics") of the data being transferred in UDT 708 as well as other information. When a client requests specific characteristics for a data transfer, the client is said to be requesting data according to the preferences of the client. The FORMATETC structure is defined in Code Table No 1. All code described herein is provided in the C++ programming language.

---

Code Table No. I

--- typedef struct tag FORMATETC {
   CLIPFORMAT                        cfformat;
   DVTARGETDEVICE             ptd;
   DWORD                            dwAspect;
   LONG                              lindex;
   DWORD                            tymed;
}FORMATETC;

---

The cfformat member of FORMATETC describes the format in which data being transferred is conveyed. The ptd member of the FORMATETC structure specifies the device for which the data being transferred is destined. The dwAspect member of the FORMATETC structure allows a client to request data from an object in different aspects. An aspect is a representation of an object. An object can have many representations such as a browsing representation, wherein the representation is appropriate for viewing only, or a print representation wherein the data in an object is formatted for printing. Therefore, for example, by appropriately setting the dwAspect member of the FORMATETC structure, a client may request the browsing aspect of an object. There are four values appropriate for the dwAspect member: DVASPECT_CONTENT, DVASPECT_THUMBNAIL, DVASPECT_ICON, and DVASPECT_DOCPRINT. Use of the DVASPECT_CONTENT value in dwAspect member signifies a request for a representation of an object appropriate for the displaying of the object. Use of the DVASPECT_THUMBNAIL value in the dwAspect member signifies a request for a representation of an object suitable for browsing. Use of the DVASPECT_ICON value in the dwAspect member signifies a request for an iconic representation of the object. Use of the DVASPECT_DOCPRINT value in the dwAspect member signifies a request for a printed representation of the object (i.e., formatted for a sequence of pages). The lindex member of the FORMATETC structure indicates a range of pages in the printed representation of the object when the dwAspect member is a DVASPECT_DOCPRINT value.

The tymed member of the FORMATETC structure indicates the requested medium through which the client would like to receive the data. The values for the tymed member correspond to bit positions, thus a client can request any combination of the appropriate values by "ORing" the values together. The values for the tymed member thus enable a client to request that data be transferred over one of a number of media. The suitable values for the tymed member of the FORMATETC structure are defined in Code Table No. 2.

Code Table No. 2

| Value | Description |
| --- | --- |
| TYMED_HGLOBAL | Indicates that the client requests the transfer medium to be global memory. |
| TYMED_FILE | Indicates that the client requests the transfer medium to be a file on the permanent storage device. |
| TYMED_ISTREAM | Indicates that the client requests the transfer medium to be a stream file. A stream file is a file used to store a continuous series of bytes. |
| TYMED_ISTORAGE | Indicates that the client requests the data to be transferred through the use of IStorage. IStorage is an interface to a storage object A storage object does not contain data, but refers to other storage objects and to stream files. The storage objects combine to form a hierarchy, similar to a directory tree on typical permanent storage devices. Just as a subdirectory can point to other subdirectories or files, a storage object can point to other storage objects and stream files. |
| TYMED_GDI | Indicates that the client requests the transfer medium to be a graphic data interface object (GDI). A GDI is an object of graphical data contained in a graphical display device, such as a computer display or printer. Access to the data in the GDI is provided through the graphical data interface. An example of a graphical data interface is provided in the Windows operating system sold by Microsoft Corporation of Redmond, Washington. |
| TYMED_MFPICT | Indicates that the client requests the transfer medium to be a metafile. A metafile is a file containin pictorial information in the form of records. Each record corresponds to a reference to a graphic data interface routine. A graphic data interface routine performs manipulation of a graphic device. |

Another structure used in the IDataObject interface is the STGMEDIUM structure. The STGMEDIUM structure is used to define the particular medium upon which the data is to be stored and, therefore, contains two members. The first member indicates the type of medium and, thus, the values for the first member are the same as those described above for the tymed member of the FORMATETC structure. The second member of the STGMEDIUM structure is a reference to the medium used for transferring the data. Although the tymed member of the FORMATETC structure and the STGMEDIUM structure are described with reference to specific media, one skilled in the art will appreciate that other media can be used.

The IDataObject interface provides nine methods which use the above-described structures. The nine methods of the IDataObject interface include: GetData, GetDataHere, QueryGetData, GetCanonicalFormatEtc, SetData, EnumFormatEtc, DAdvise, DUnadvise and EnumDAdvise. The IDataObject interface is defined in Code Table No. 3. Each method of the IDataObject interface is discussed separately below.

Code Table No. 3

```
interface MDataObject:[Unknown {
virtual   HRESULT   GetData (pformatetc, pmedium) = 0;
virtual   HRESULT   GetDataHere(pformatetc, pmedium) = 0;
virtual   HRESULT   QueryGetData(pformatetc) =0;
virtual   HRESULT   GetCanonicalFormatEtc(pformatetcin,
                        pformatEtcOut) = 0;
virtual   HRESULT   SetData(pformatetc, pmedium, fRelease) =0;
virtual   HRESULT   EnumFormatEtc(wDirection,
                        ppenumFormatEtc) =0;
virtual   HRESULT   DAdvise(pformatetc, grfAdvf, pAdvSink,
                        pdwConnection) =0;
virtual   HRESULT   DUnadvise(dwConnection) =0;
virtual   HRESULT   EnumDAdvise(ppenumAdvise) =0;
}
```

The GetData method of the IDataObject interface allows a client to retrieve data from an object that supports the IDataObject interface. The client may retrieve data from the object according to the preferences of the client. Thus, the client may specify a specific format, a specific aspect, a format for a specific device and conveyance through a specific medium. The parameters of the GetData method are defined in Code Table No. 4.

Code Table No. 4
HRESULT IDataObject::GetData(pformatetc, pmedium)

| Argument | Type |
| --- | --- |
| pformatetc | FORMATETC * |
| pmedium | STGMEDIUM * |
| return_value | HRESUIT * |

The pformatetc parameter is a pointer to a FORMATETC structure and the members of the FORMATETC structure specify the preferences of the client for receiving the data. The tymed member of the pformatetc parameter indicates at least one medium upon which the client would like to receive the data. If the server can support the requested preferences and one of the requested media, the server returns the requested data on the medium specified by the pmedium parameter. Thus, the pmedium parameter is an output parameter. Otherwise, if the server cannot support the preferences or the requested media, the GetData method returns an error. The return value parameter of the GetData method is a value indicating a successful completion or unsuccessful completion of the GetData method. An example of an error that may occur is when the server cannot convert the data into the requested format.

Figure 8:
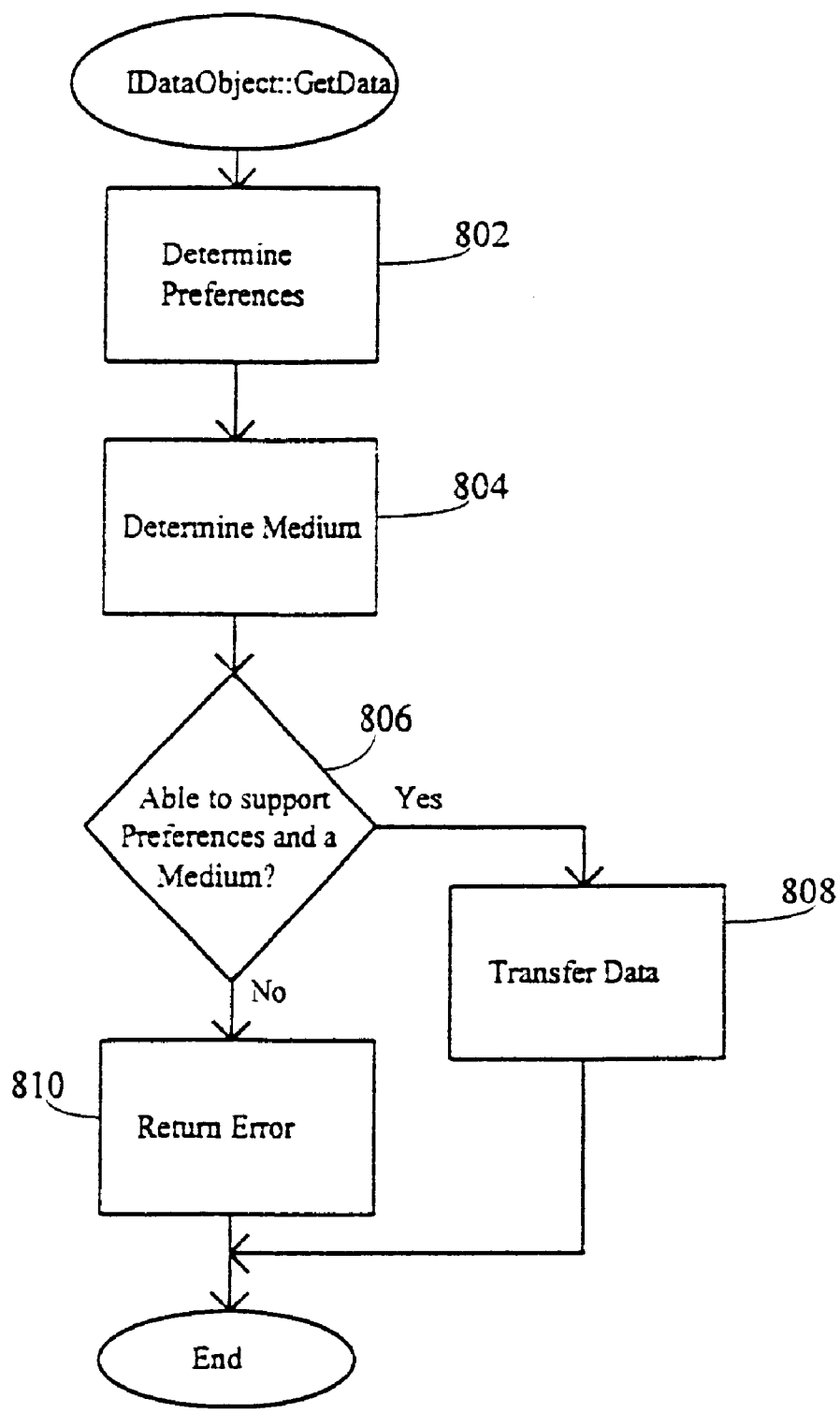
FIG. 8 depicts a flowchart of the steps performed by a GetData method of an IDataObject interface of the preferred embodiment of the present invention.

FIG. 8 depicts a flowchart of the steps performed by the GetData method of the IDataObject interface of the preferred embodiment of the present invention. Upon invocation, the GetData method determines the preferences of the client by accessing the structure referenced by the pformatetc parameter (step 802). The GetData method next determines the media upon which the client would like to receive the requested data by accessing the tymed member of the FORMATETC structure referenced by the pformatetc parameter (step 804). The GetData method then determines whether the server is able to support the requested preferences and one of the requested media (step 806). Since the GetData method was implemented by the developers of the server in which the object is contained, the GetData method knows of the media and preferences that can be supported by the object and the server. If the server is able to support the requested preferences and one of the requested media, the server returns the data according to the requested preferences on a requested medium to the client (step 808). If, however, the server is unable to support either the preferences or one of the requested media, the GetData method returns an error to the client (step 810).

The GetDataHere method of the IDataObject interface permits a client to specify the medium that is to be used for transferring the requested data. Since the method receives a reference to the medium as a parameter, the method only copies the requested data onto the medium specified by the parameter. However, the method must still determine whether the server can support the requested preferences. The GetDataHere method is defined in Code Table No. 5.

Code Table No. 5
HRESULT IDataObject::GetDataHere(pformatetc, pmedium)

| Argument | Type |
| --- | --- |
| pformatetc | FORMATETC * |
| pmedium | STGMEDIUM * |
| return_value | HRESULT |

The pformatetc parameter of the GetDataHere method is a pointer to a FORMATETC structure which specifies the preferences of the client for the requested data. The pmedium parameter is a reference to the medium to be used for transferring the requested data. The pmedium parameter is an input parameter. The return_value parameter of the GetDataHere method is an output parameter indicating a successful completion or unsuccessful completion of the GetDataHere method. One example of an error that may occur is when the server is unable to support the requested format for the requested data.

Upon invocation of the GetDataHere method, the GetDataHere method first determines if the requested preferences for the requested data can be supported by the server. If the requested preferences can be supported by the server, the GetDataHere method transfers the requested data over the medium specified by the pmedium parameter and returns a value indicating success in the return value parameter. If the requested preferences cannot be supported by the server, the GetDataHere method returns a value in the return value parameter indicating that an error occurred.

The QueryGetData method in the IDataObject interface allows a client to test whether the server would be able to return specified data by the GetData method according to specified preferences on a specified medium. The definition of the QueryGetData method is provided in Code Table No. 6.

Code Table No. 6
HRESULT IDataObject::QueryGetData(pformatetc)

| Argument | Type |
| --- | --- |
| pformatetc | FORMATETC * |
| return_value | HRESULT |

The pformatetc parameter of the QueryGetData method is a pointer to a FORMATETC structure. The FORMATETC structure referenced by the pformatetc parameter contains the preferences requested by the client including a medium for transferring the data. The return_value parameter of the QueryGetData method contains a value indicating a successful or unsuccessful completion of the QueryGetData method. An error that may be referenced in the return_value parameter is the inability of the server to support the requested format, the requested aspect or the requested medium.

The GetCanonicalFormatEtc method of the IDataObject interface allows a client to query an object to determine the characteristics of the data that will be returned to the client for a given input FORMATETC parameter. Thus, the GetCanonicalFormatEtc method gives the client the ability to determine whether the client will receive data in a format for which the client has already received data. Therefore, if the client has already requested data from an object and has received the requested data in a specific format, before requesting (by GetData) a new format for the received data, the client can use the GetCanonicalFormatEtc method to determine whether the object will return the new request for the data in the same format as the previous request for the data. Use of the GetCanonicalFormatEtc method by a client can save the client from using memory or disk space for unnecessary duplicate copies of similar data having similar characteristics. The definition for the GetCanonicalFormatEtc method is provided in Code Table No. 7.

Code Table No. 7
HRESULT IDataObject::GetCanonicalFormatEtc(pformatetc, pmedium)

| Argument | Type |
| --- | --- |
| pformatetcIn | FORMATETC * |
| pformatetcOut | FORMATETC * |
| return_value | HRESULT |

The pformatetcIn parameter is a pointer to a FORMATETC structure that contains the preferences of the client for the requested data. The pformatIn is an input parameter. The pformatetcOut parameter is a reference to a FORMATETC structure which contains the characteristics of the requested data that will be returned for the given pformatetcIn parameter. The return_value contains an indication of whether the characteristics that can be supported by the server is the same as the characteristics specified by pformatetcIn.

The SetData method of the IDataObject interface allows a client to send data to an object according to specified characteristics over a specified medium. The definition for the SetData method is provided in Code Table No. 8.

Code Table No. 8
HRESULT IDataObject::SetData(pformatetc, pmedium, fRelease)

| Argument | Type |
| --- | --- |
| pformatetc | FORMATETC * |
| pmedium | STGMEDIUM * |
| fRelease | BOOL |
| return_value | HRESULT |

The pformatetc parameter of the SetData method is a pointer to a FORMATETC structure which contains the characteristics of the data sent to an object. The pmedium parameter is a reference to the medium used for transferring the data. The fRelease parameter of the SetData method indicates whether the client or the server is responsible for releasing the medium specified by the pmedium parameter after the data has been sent to the object. The return_value contains a value indicating a successful or unsuccessful completion to the SetData method.

The EnumFormatEtc method of the IDataObject interface allows a client to enumerate the available characteristics of data sent to or received from an object. This method allows a client, before requesting data, to determine whether the data that the client requests can be received according to the preferences of the client. The definition of the EnumFormatEtc method is provided in Code Table No. 9.

Code Table No. 9
HRESULT IDataObject::EnumFormatEtc)wDirection, ppenumFormatEtc)

| Argument | Type |
| --- | --- |
| wDirection | WORD |
| ppenumFormatEtc | IEnumFORMATETC** |
| return_value | HRESULT |

The wDirection parameter of the EnumFormatEtc method is used for setting a value indicating whether the request is for characteristics supported for a SetData or a GetData method. The ppenumFormatEtc is a pointer to a pointer to an enumerator which contains the available formats for the data in the object. The return value is a value indicating a successful or unsuccessful completion of the EnumFormatEtc method.

The DAdvise method of the IDataObject interface allows a client to establish an advisory connection between an object and an advisory sink. An advisory connection is a logical connection between an advisory sink and an object where, when the data of the object changes, the server notifies the advisory sink of the change. The advisory sink may be a client, server, object or other software entity. In calling the DAdvise method, the client requests the composition of the notification and how the notification will be performed. For example, the client can request that the object suppress the transfer of data in the notification or that the object perform only one notification. Once the client sets up an advisory connection, when the data in the referenced object changes, the server invokes the OnDataChange method of the IAdviseSink interface, which notifies the advisory sink and is passed to the object as a parameter in the DAdvise method. The IAdviseSink interface will be described in more detail below. The DAdvise method is defined in Code Table No. 10.

Code Table No. 10
HRESULT IDataObject::DAdvise(pformatetc, grfAdvf, pAdvSink, pdwCoanection)

| Argument | Type |
| --- | --- |
| pformatetc | FORMATETC* |
| grfAdvf | DWORD |
| pAdvSink | IAdviseSink* |
| pdwConnection | DWORD |
| return_value | HRESULT |

The pformatetc parameter of the DAdvise method contains a pointer to a FORMATETC structure which indicates the preferences of the client for the data returned in the notification. The grfAdvf parameter contains a value indicating the choices of the client for the composition of the notification and how the notification will be performed. Acceptable values for the grfAdvf parameter include: ADVF_NODATA, ADVF_ONLYONCE, ADVF_PRIMEFIRST, and ADVF_DATAONSTOP. The ADVF_NODATA value in the gradvf parameter indicates not to return the changed data in the notification. A value of ADVF_ONLYONCE indicates that the advisory connection will be disconnected after one notification. A value of ADVF_PRIMEFIRST indicates that the server will send an additional notification to the advisory sink when the referenced data in the object first becomes available. A value of ADVF_DATAONSTOP indicates that an additional notification will be sent to the advisory sink upon the shutdown of the server. Also, the additional notification will contain the data that has chanced. The values for the grfAdvf parameter are defined in terms of bits, thus, any combination of the values may be "ORed" together. One combination in particular, ADVF_ONLYONCE ORed with ADVF_PRIMEFIRST, allows a client to receive data from a server without having to wait for the data to become available (i.e., the client will receive the data at a later time). Although only one combination of the values for the grfAdvf parameter is described, one skilled in the art will recognize that other combinations of the values for the grfAdvf parameter provide useful functionality.

The pAdvSink parameter is a pointer to an IAdviseSink interface. The IAdviseSink interface contains a method defined by the client ("OnDataChange"). The OnDataChange method has two parameters. The first parameter to the OnDataChange method is a pointer to a FORMATETC structure indicating the preferences of the client for the data in the notification. The second parameter to the OnDataChange method is a pointer to a medium to be used for transferring the notification.

The pdwConnection is a handle to the advisory connection returned to the client upon successful completion of the DAdvise method. The advisory connection handle is used by the client to uniquely identify an advisory connection. The return_value parameter of the DAdvise method indicates a successful or unsuccessful creation of an advisory connection.

The DUnadvise method in the IDataObject interface provides for disconnecting an advisory connection that was set up using the DAdvise method. The DUnadvise method is defined in Code Table No. 11.

Code Table No. 11
HRESULT IDataObject::DUnadvise(pdwCoanection)

| Argument | Type |
| --- | --- |
| dwConnection | DWORD |
| return_value | HRESULT |

The dwConnection parameter of the DUnadvise method is a handle to the advisory connection that the client wants disconnected. The advisory connection handle was returned to the client upon a successful completion of the DAdvise method. The return_value parameter indicates whether the advisory connection was successfully disconnected.

The EnumDAdvise method of the IDataObject interface allows a client to enumerate all of the advisory connections currently on an object. The EnumDAdvise method is defined in Code Table No. 12.

Code Table No. 12
HRESULT IDataObject::EnumDAdvise(ppenumAdvise)

| Argument | Type |
|---|---|
| ppenumAdvise | IEnumSTATDATA* |
| return_value | HRESULT |

The ppenumAdvise parameter for the EnumDAdvise method is a pointer to a pointer to a list of structures containing connection information for all connections on an object. The information contained in each structure includes the pformatetc, grfAdvf, dwConnection, and pAdvSink parameters that were passed to the server upon creation of the advisory connection through the DAdvise method. The return_value of the EnumDAdvise is a value indicating a successful or unsuccessful completion of the EnumDAdvise method.

Figure 9:
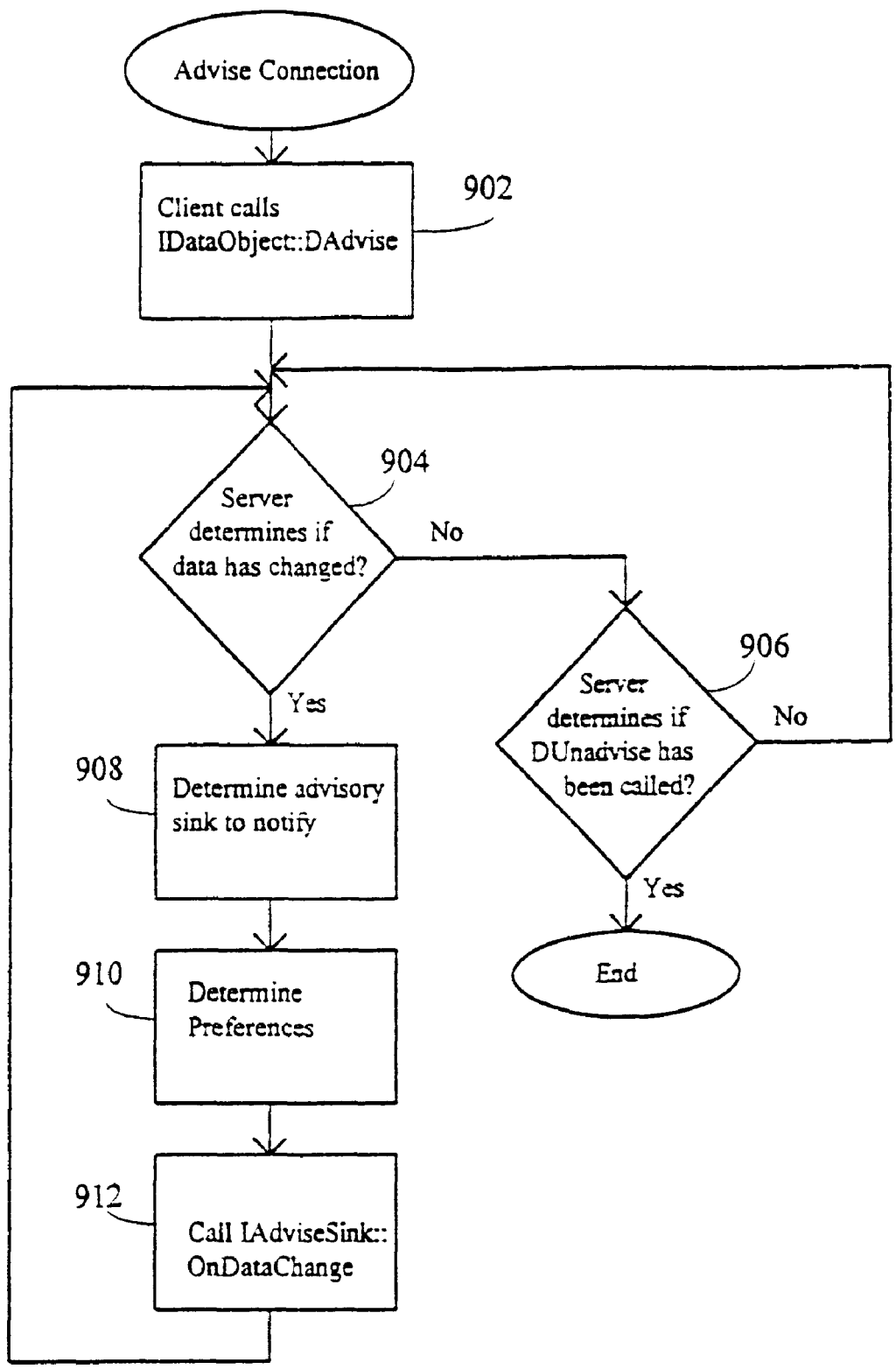
FIG. 9 depicts a flowchart of the steps performed during an advisory connection in the preferred embodiment of the present invention.

FIG. 9 depicts a flowchart of the steps performed for an advisory connection. In order to create an advisory connection, the client calls the DAdvise method of the IDataObject interface. After the advisory connection has been created, the server waits for the data in the object to change. Once the data in the object chances, the server sends a notification to the advisory sink by invoking the OnDataChange method of the IAdviseSink interface. The client first calls the DAdvise method of the IDataObject interface speckling the appropriate parameters (step 902). By invoking the DAdvise method, an advisory connection is established with the object. Next the server determines if the data has changed (step 904). If the data has not changed, the server determines if the advisory connection has been disconnected (step 906). If the advisory connection has been disconnected, processing ends. However, if the advisory connection has not been disconnected, the server returns to step 904. If the data in the object has changed, processing continues to step 908, wherein the server determines the advisory sink to notify (step 908). The server determines the advisory sink to notify for an object by accessing a registry which contains information regarding all advisory connections on all objects in the server. Next, the server determines the preferences of the client for the notification by accessing the registry (step 910). After determining the preferences of the client, the server invokes the OnDataChange method in the IAdviseSink interface that was passed into the object when the client called the DAdvise method in the IDataObject interface (step 912). Invocation of the OnDataChange method in the IAdviseSink interface sends the notification to the advisory sink. After the notification has been sent to the advisory sink, the server continues to wait for the data to change.

Figure 10A:
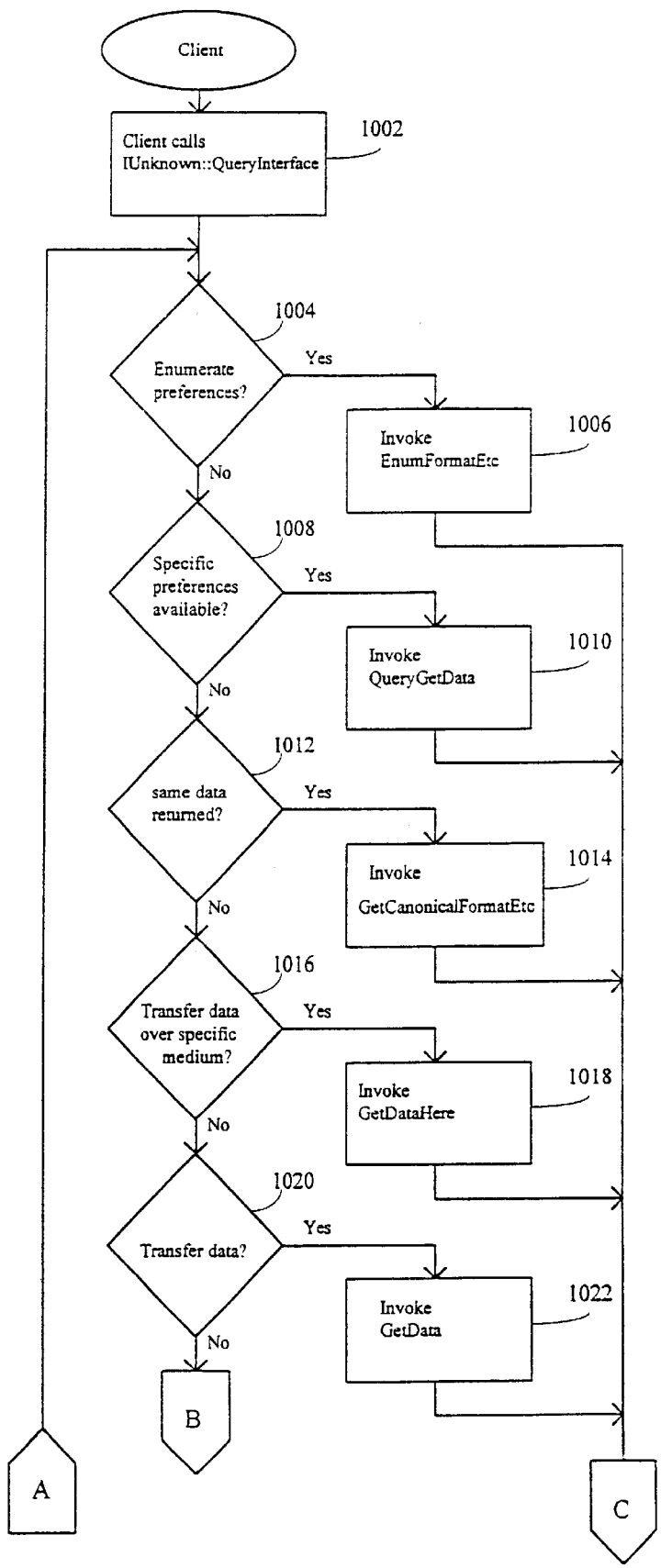
FIGS. 10A and 10B depict a flow chart of the steps performed by a client performing an application of data and transfer functionality utilizing the uniform data transfer mechanism of the preferred embodiment of the present invention.
Figure 10B:
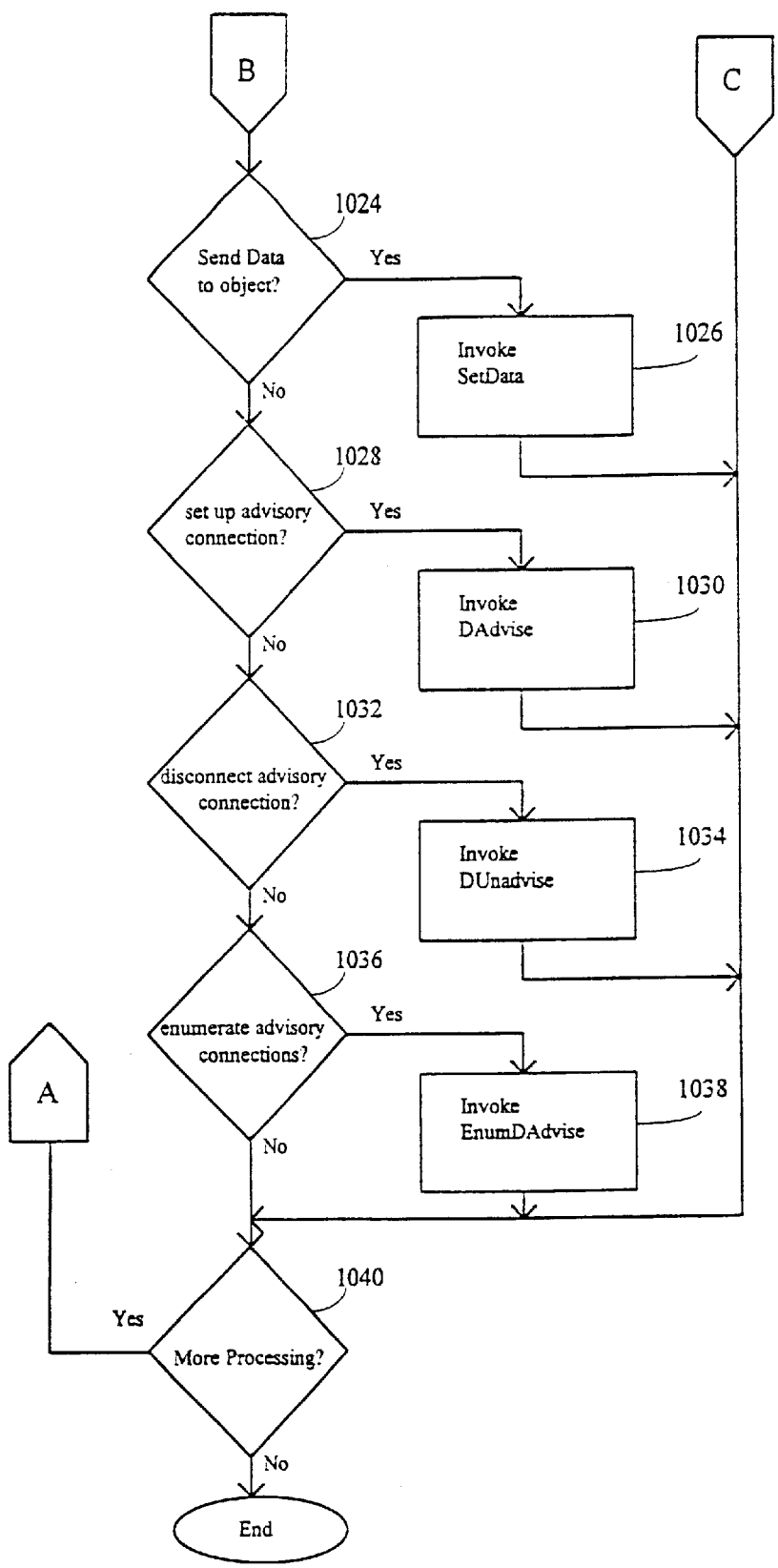

FIGS. 10A and 10B depict a flowchart of the steps performed by a client performing data transfer utilizing UDT of the preferred embodiment of the present invention. The client first calls the QueryInterface method of the IUnknown interface in order to receive a pointer to the IDataObject interface for an object (step 1002). After receiving the pointer to the IDataObject interface, the client may invoke the methods of the IDataObject interface directly and, thus, transfer data utilizing UDT. As part of the UDT-related processing of the client, the client may decide to receive data from the object. However, before receiving data from the object, the client has a choice of whether to enumerate the available preferences for the data in the object (step 1004), determine whether specific preferences are supported by the server (step 1008), or query the server whether a second request for data would yield the same data as a previous request with different preferences (step 1012). If the client determines to enumerate the available preferences for the data, the client invokes the EnumFormatEtc method of the IDataObject interface (step 1006). If the client determines to query the server whether specific preferences are supported, the client invokes the QueryGetData method of the IDataObject interface (step 1010). If the client determines to query the server whether a second request for data would yield the same data as a previous request with different preferences, the client invokes the GetCanonicalFormatEtc method of the IDataObject interface (step 1014).

When the client is ready to receive the data, the client may choose to transfer the data over a specific medium (step 1016), or the client may choose to request the data so that the server can pick which medium to transfer the data over (step 1020). If the client determines to transfer the data over a specific medium, the client invokes the GetDataHere method of the IDataObject interface (step 1018). If the client decides to allow the server to pick the medium used for transferring the data, the client invokes the GetData method of the IDataObject interface (step 1022).

At some point during the processing of the client, the client may determine to send data to the object (step 1024 in FIG. 10B). When the client determines to send data to the object, the client invokes the SetData method of the IDataObject interface (step 1026). Instead of, or in addition to sending and receiving data from the object, the client may decide to perform processing associated with advisory connections. If the client determines to perform processing associated with advisory connections, the client may choose to set up an advisory connection (step 1028), disconnect an advisory connection (step 1032), or enumerate all advisory connections on the object (step 1036). If the client chooses to set up an advisory connection, the client invokes the DAdvise method of the IDataObject interface (step 1030). If the client chooses to disconnect an advisory connection, the client invokes the DUnadvise method of the IDataObject interface (step 1034). If, however, the client decides to enumerate all advisory connections on an object, the client invokes the EnumDAdvise method of the IDataObject interface (step 1038).

After invoking one method of the IDataObject interface, the client may determine to perform more UDT-related processing (step 1040). If the client determines to perform more UDT-related processing, the client continues to step 1004 wherein the client may invoke another method of the IDataObject interface. However, if the client determines not to perform more UDT-related processing, UDT-related processing ends.

Figure 11:
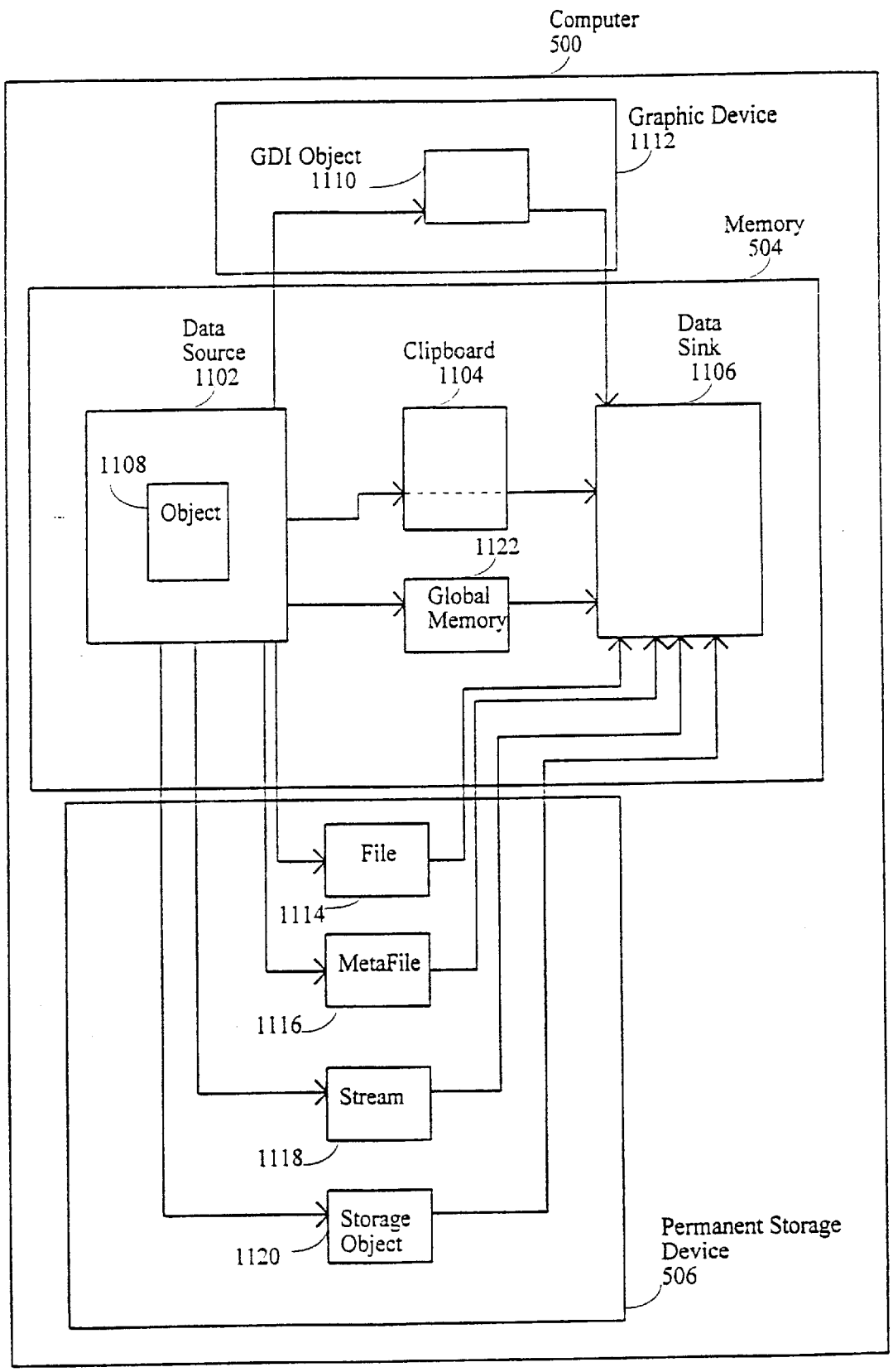
FIG. 11 depicts a computer system for performing a cut-and-paste application utilizing the uniform data transfer mechanism of the preferred embodiment of the present invention.

Following is a description of five applications of data transfer functionality utilizing UDT of the preferred embodiment of the present invention. The five applications utilizing UDT include: cut-and-paste, drag-and-drop, real time data transfer, custom marshalling and programmatic transfer. FIG. 11 depicts a block diagram of a cut-and-paste application utilizing UDT of the preferred embodiment. The computer 500 contains a graphic device 1112, a memory 504 and a permanent storage device 506. The graphic device contains a GDI object 1110. The memory of the computer system 504 contains a data source 1102, a clipboard 1104, global memory 1122 and a data sink 1106. The data source 1102 contains an object 1108. The permanent storage device 506 contains a file 1114, a metafile 1116, a stream file 1118 and a storage object 1120. In performing a cut-and-paste application, when the user performs a cut operation, the data contained in the object 1108 is not copied to the clipboard 1104 like in prior methods. Instead, UDT is invoked and a reference to the object 1108 (a pointer to the IDataObject interface) is copied to the clipboard 1104. After the user selects the paste operation, the data sink 1106 locates the pointer to the IDataObject interface in the clipboard 1104, and uses the IDataObject interface to copy the data from the object 1108 to the data sink 1106 through a medium 1110, 1114, 1116, 1118, 1120 and 1122. Since the cut-and-paste of the preferred embodiment uses a pointer to the IDataObject interface instead of copying the data, the format conversion of the data does not occur until the data sink 1106 requests the data through the IDataObject interface. This provides the data sink 1106 with the ability to delay the conversion of the data ("delayed rendering"). Also, when the data sink 1106 needs multiple formats of the data, the data sink 1106 may select one format, use the format and then request another format. This allows the data sink 1106 to start processing the data without having to wait for all of the format conversions to take place. Delayed rendering, thus, allows for a more efficient use of the data sink 1106 and reduces the total system performance degradation associated with format conversion.

Figure 12:
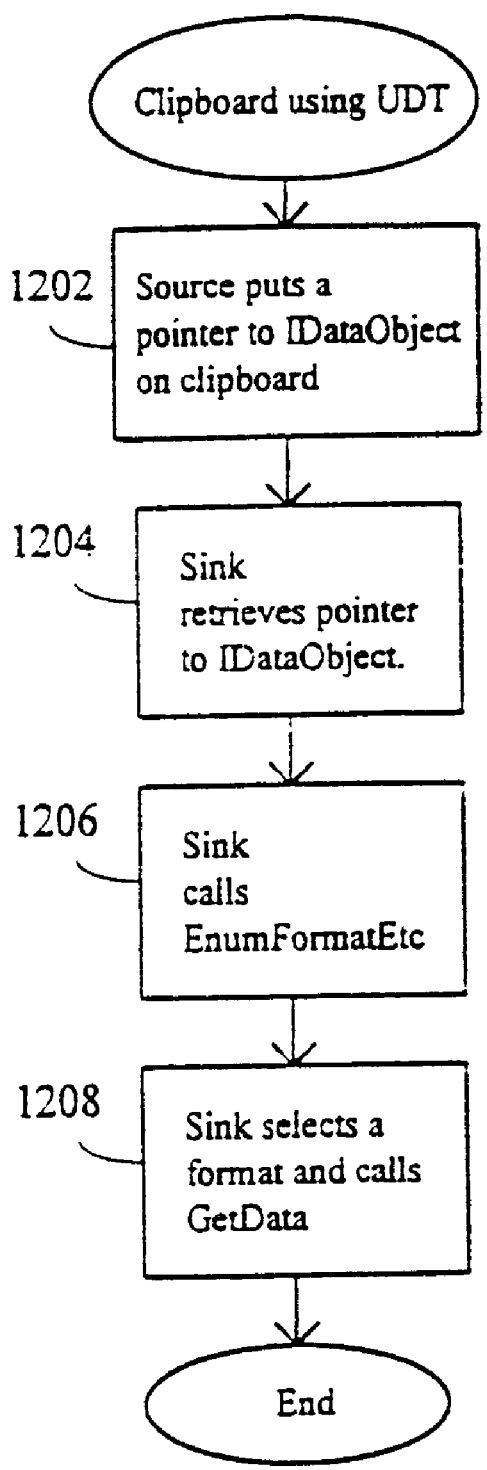
FIG. 12 depicts a flowchart of the steps performed by the computer system of FIG. 11.

FIG. 12 depicts a flowchart of the steps performed by a cut-and-paste application utilizing UDT of the preferred embodiment. First, the data source 1102 places a pointer to the IDataObject interface onto the clipboard 1104 (step 1202). Next upon invocation of the paste operation, the data sink 1106 accesses the clipboard 1104 to retrieve the pointer to the IDataObject interface (step 1204). After receiving the pointer to the IDataObject interface, the data sink 1106 can access the object 1108 directly. The data sink 1106 then uses the EnumFormatEtc method of the IDataObject interface to enumerate the formats of the requested data so that the data sink 1106 may choose a format acceptable for the needs of the data sink 1106 (step 1206). For example, if the data sink 1106 can accept more than one format, enumerating the available formats allows the data sink 1106 to determine which format would be best suited for the purposes of the data sink and, perhaps, the easiest to process. After enumerating the available formats of the data, the data sink 1106 selects a format and invokes the GetData method of the IDataObject interface to transfer the data from the data source 1102, through a medium 1110, 1114, 1116, 1118, 1120, 1122, to the data sink 1106 and perform the appropriate format conversion. In computers which use OLE, the data source 1102 calls the OleSetClipboard function to place an IDataObject reference onto the clipboard 1104 and the data sink 1106 calls the OleGetClipboard function to retrieve the pointer to the IDataObject interface from the clipboard 1104.

Figure 13:
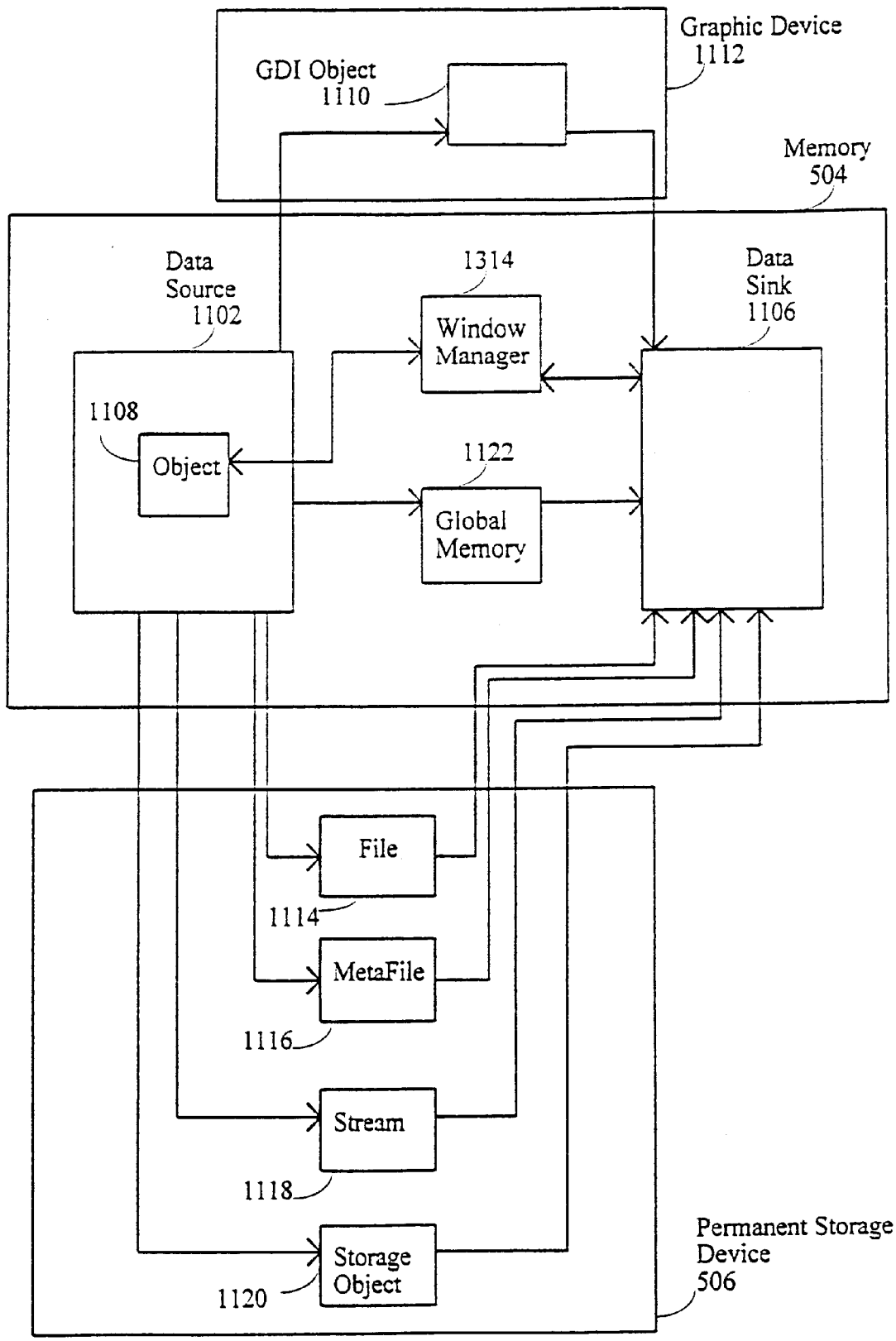
FIG. 13 depicts a computer system for performing a drag-and-drop application utilizing the uniform data transfer mechanism of the preferred embodiment of the present invention.

FIG. 13 depicts a block diagram of a drag-and-drop application utilizing UDT of the preferred embodiment. The application uses a graphic device 1112, memory 504 and a permanent storage device 506. The graphic device 1112 contains a graphic device interface object (GDI) 1110. The memory 504 contains a data source 1102, global memory 1122, a window manager 1314 and a data sink 1106. The data source 1102 contains an object 1108. The permanent storage device 506 contains a file 1114, a metafile 1116, a stream file 1118 and a storage object 1120. In performing a drag-and-drop application, when the user drops selected data into the data sink 1106, the window manager 1314 establishes a connection between the data sink 1106 and the object 1108. The window manager 1314 establishes the connection between the object 1108 and the data sink 1106 by passing a pointer to the IDataObject interface to the data sink 1106. By receiving a pointer to the IDataObject interface, the data sink 1106 can access the object 1108 directly. After receiving the pointer to the IDataObject interface, the data sink 1106 uses the GetData method of the IDataObject interface to transfer the data in the object 1108 from the data source 1102 through a medium 1110, 1114, 1116, 1118, 1120, 1122 and to the data sink 1106.

Figure 14:
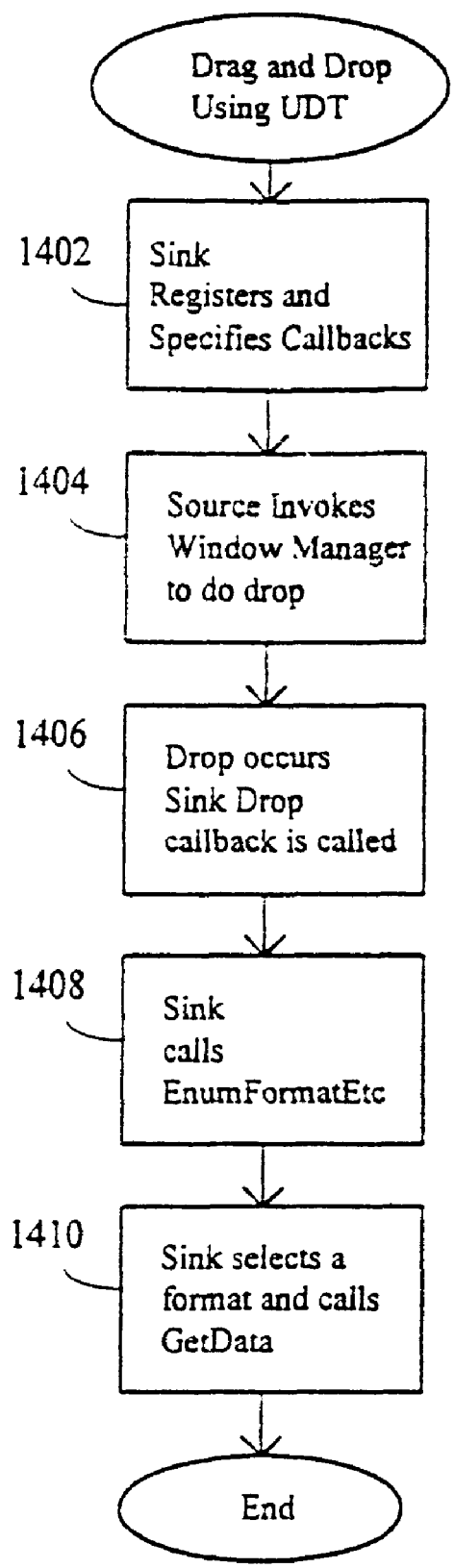
FIG. 14 depicts a flowchart of the steps performed by the computer system of FIG. 13.

FIG. 14 depicts a flowchart of the steps performed by a drag-and-drop application utilizing UDT of the preferred embodiment. First, the data sink 1106 registers with the window manager 1314. Registration signifies that the data sink 1106 is available for drops (step 1402). In computer systems wherein a process may have multiple windows, the data sink 1106 specifies which windows of the data sink 1106 are available for drops. In addition, when registering with the window manager 1314, the data sink 1106 specifies callback routines to be invoked upon a drop. A callback routine is a function invoked upon the occurrence of a specific event. Next, the data source 1102 invokes the window manager 1314 to perform the drag-and-drop operation (step 1404). After the drop occurs, the callback routine specified by the data sink 1106 at registration with the window manager 1314 is invoked by the window manager 1314 (step 1406). The window manager 1314 invokes the callback routine with a pointer to the IDataObject interface, and the callback routine uses the IDataObject interface pointer to call the EnumFormatEtc method in the IDataObject interface (step 1408). The callback routine then selects an acceptable format for receiving the data and invokes the GetData method in the IDataObject interface to receive the data (step 1410). In computers which use OLE, the data sink 1106 registers with the window manager 1314 by calling the RegisterDragDrop function and specifying the windows in which a drop is allowed and a Drop callback routine. Further, in a computer using OLE, the data source 1102 calls the DoDragDrop function to invoke the window manager 1314 to perform a drag-and-drop operation.

Figure 15:
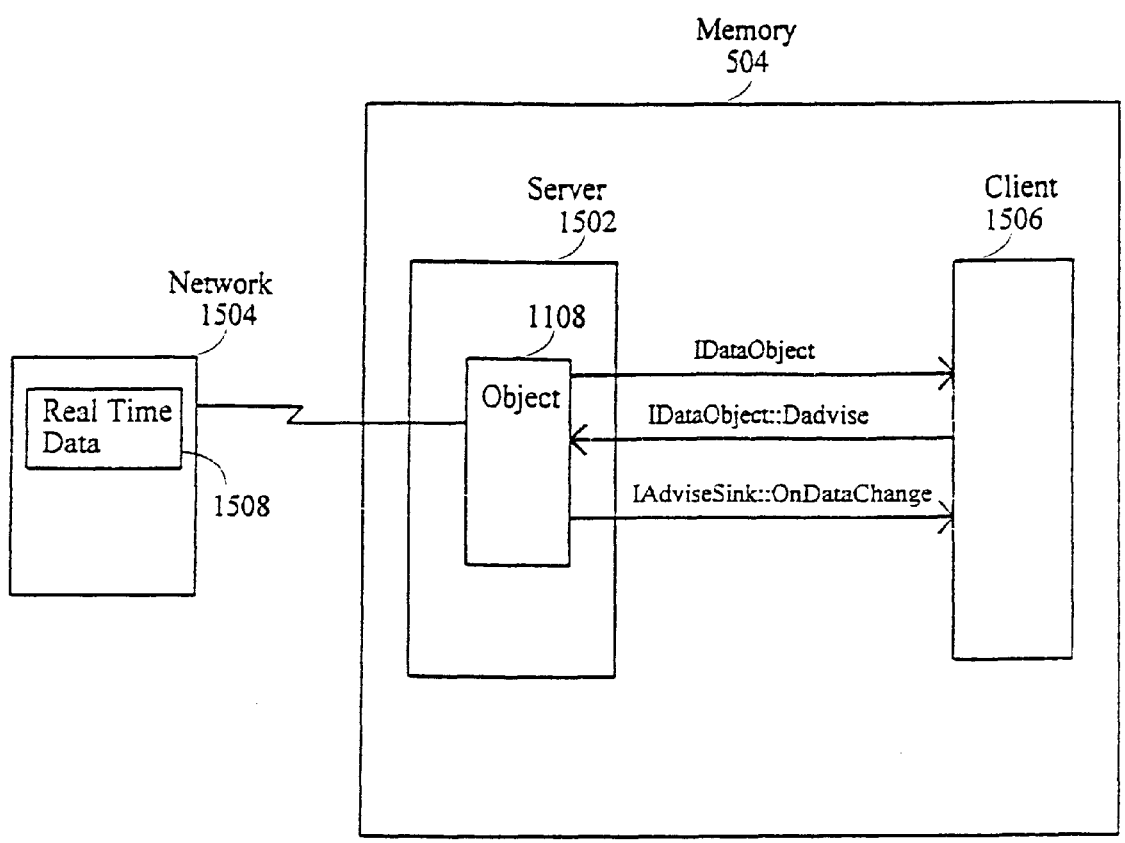
FIG. 15 depicts a computer system for performing real time data transfer utilizing the uniform data transfer mechanism of the preferred embodiment of the present invention.

FIG. 15 depicts a diagram of a real time data transfer application utilizing UDT of the preferred embodiment. A real time data transfer application (XRT) is an application that receives real time data from a network and sends the real time data to an object. An example of an XRT system is a system which receives real time stock quotes from the New York Stock Exchange and sends the real time stock quotes to an object so that spreadsheets with an advisory connection to that object are automatically updated. The XRT application uses a network 1504 and the memory of a computer 504. Within the memory 504 is a server 1502 and a client 1506. The server 1502 contains an object 1108. The client 1506 uses the real time data 1508 received from the object 1108 for processing. In order to receive the real time data 1508 of the object 1108, the client 1506 accesses the IDataObject interface through the IUnknown interface of the object 1108. After receiving a pointer to the IDataObject interface, the client 1506 invokes the DAdvise method of the IDataObject interface to create an advisory connection. Thus, when the object 1108 receives real time data 1508 from the network 1504, which updates data upon which the client 1506 has established an advisory connection, the server 1502 invokes the OnDataChange method of the IAdviseSink interface and informs the client 1506 of the new data.

Figure 16:
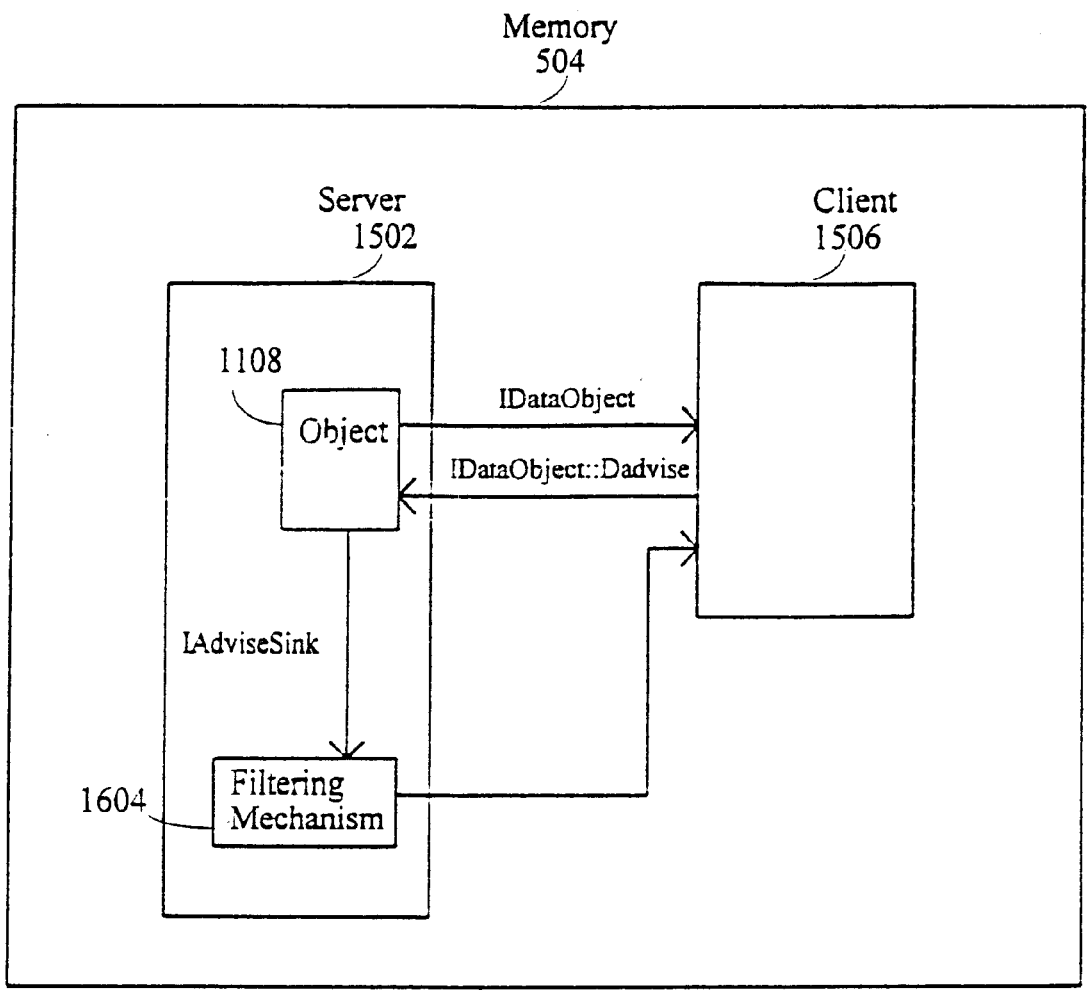
FIG. 16 depicts a computer system for performing custom marshalling utilizing the uniform data transfer mechanism of the preferred embodiment of the present invention.

FIG. 16 depicts a custom marshalling application utilizing UDT of the preferred embodiment. A custom marshalling application is an application which preprocesses data before the data is returned to a client over an advisory connection.

The custom marshalling application operates in the memory 504 of a computer. The memory 504 contains a server 1502 and a client 1506. The server 1502 contains an object 1108 and a filtering mechanism 1604. The filtering mechanism 1604 is supplied by the client and performs some operation upon data contained within the object 1108. The operation that the filtering mechanism 1604 may perform includes calculations and selectivity. Therefore, the server 1502 invokes the filtering mechanism 1604 provided by the client 1506, and the client 1506 is notified of the change of some data in the object 1108. In order to perform custom marshalling, the client 1506 first accesses the IDataObject interface through the IUnknown interface of the object 1108. The client 1506 then invokes the DAdvise method of the IDataObject interface creating an advisory connection whereby the filtering mechanism 1604 is notified if data in the object 1108 changes. The server 1502 sends a notification to the filtering mechanism 1604 when data in the object 1108 changes by using the OnDataChange method in the IAdviseSink interface. The filtering mechanism 1604 then performs an operation on the received data and sends the resulting data to the client 1506.

Figure 17:
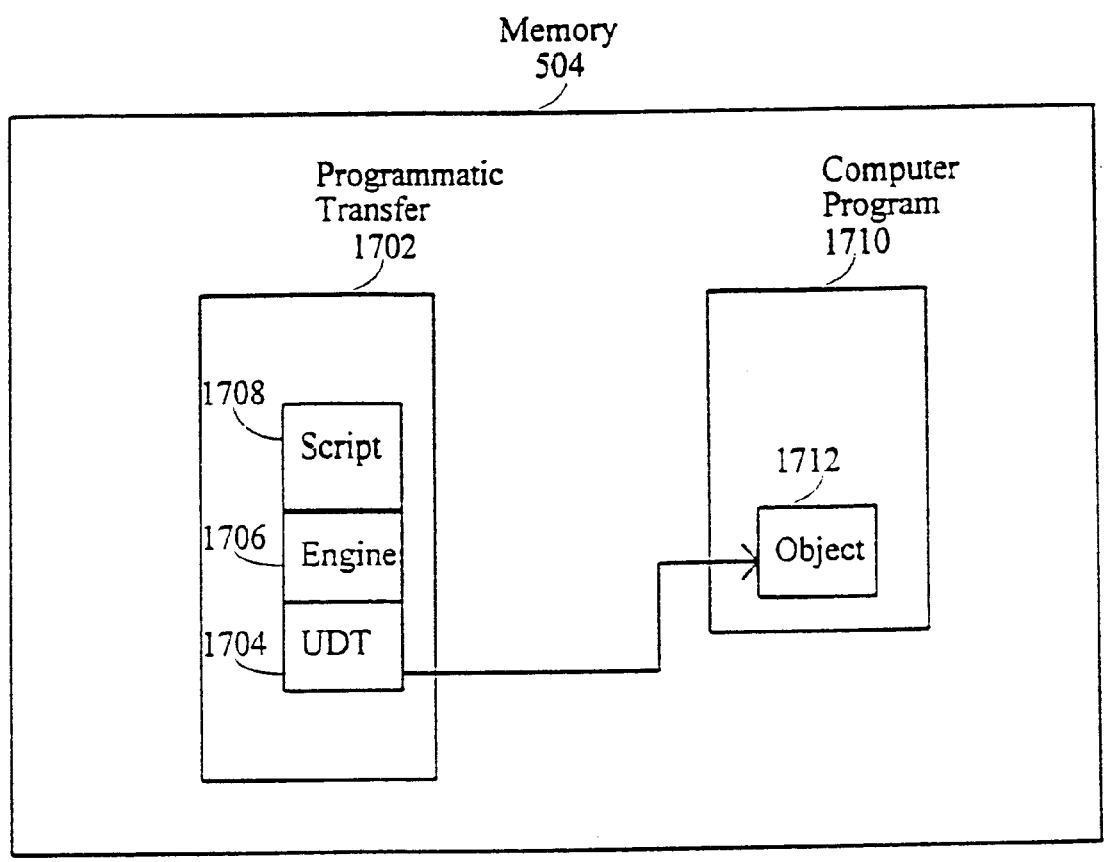
FIG. 17 depicts a computer system for performing programmatic transfer utilizing the uniform data transfer mechanism of the preferred embodiment of the present invention.

FIG. 17 depicts a programmatic transfer application utilizing UDT of the preferred embodiment of the present invention. The programmatic transfer application provides a mechanism whereby developers may programmatically use UDT. The developer inputs commands into a script and the script is executed by an engine that generates commands for UDT. After receiving the generated commands, UDT performs the received commands. The programmatic transfer mechanism 1702 and a computer program 1710 reside within the memory 504 of a computer system. The programmatic transfer mechanism 1702 contains a script 1708, an engine 1706 and the UDT 1704. The computer program 1710 contains an object 1712. The script 1708 is a batch file of commands understandable by the engine 1706. The engine 1706 is a computer program which reads the script 1708 and invokes commands understandable by the UDT 1704. The uniform data transfer mechanism 1704 may be used to communicate with an object 1710, other clients or servers. In order to use the programmatic transfer application 1702, a developer creates a script 1708 containing commands that the developer wishes to invoke. The engine 1706 then reads the script 1708, creates parameters from the received script commands and invokes the appropriate methods of UDT 1704. The programmatic transfer mechanism is a powerful tool that provides a developer with quick and easy access to UDT 1704. The developer has quick access because the developer only inputs commands to the script 1708 in order to invoke UDT 1704. Such quick and easy access to UDT 1704 provides a tool that developers may use to test computer programs which transfer data.

Figure 18:
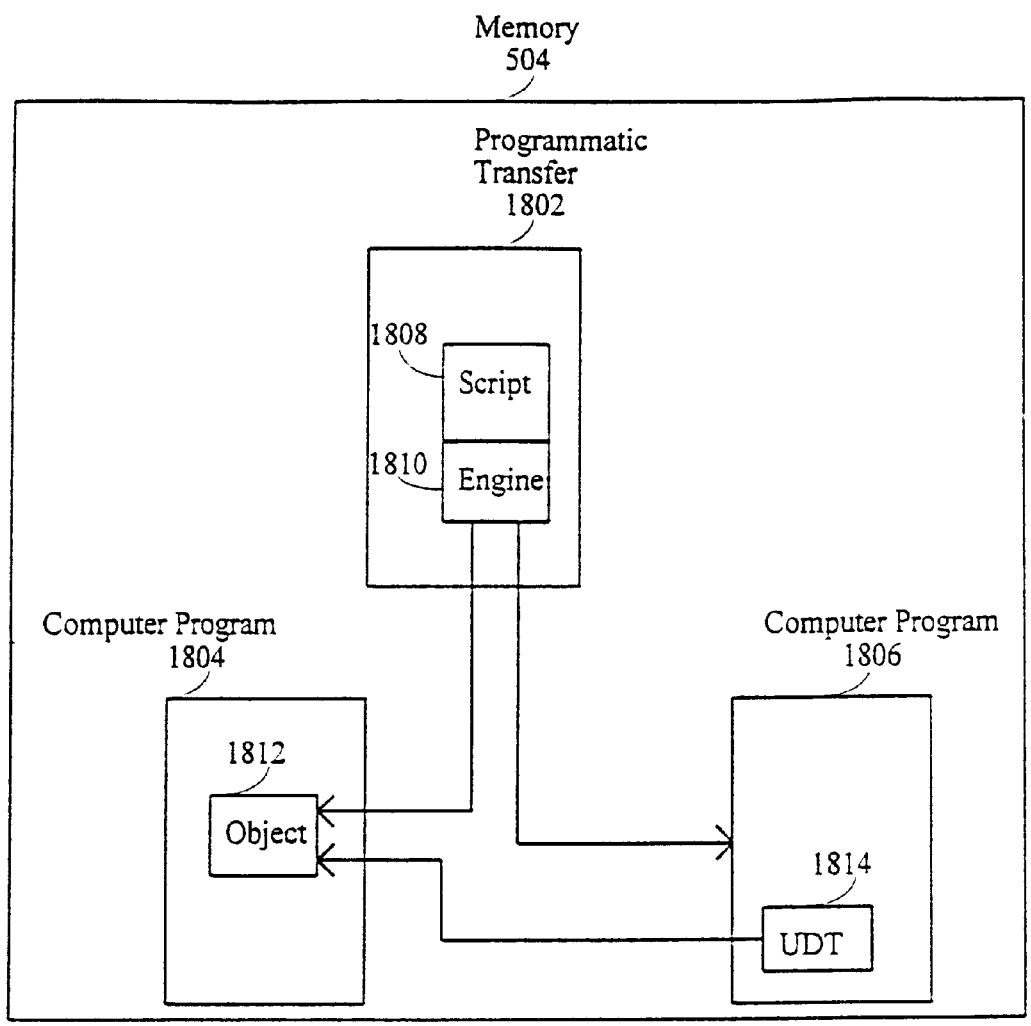
FIG. 18 depicts an alternative computer system for performing programmatic transfer utilizing the uniform data transfer mechanism of the preferred embodiment of the present invention.

An alternative computer system for performing the programmatic transfer mechanism utilizing the preferred embodiment of the present invention is depicted in FIG. 18. The programmatic transfer mechanism 1802 and two computer programs 1804, 1806 reside within the memory 504 of a computer system. The programmatic transfer mechanism 1802 has a script 1808 containing commands and an engine 1810 which understands and invokes the commands of the script 1808. The computer program 1804 contains an object 1812 and the computer program 1806 contains UDT 1814 of the preferred embodiment. In the alternative programmatic transfer application, a developer inputs commands into the script 1808, and the commands are executed by the engine 1810. The executed commands retrieve a pointer to the IDataObject interface of the object 1812 and pass the pointer of the IDataObject interface to the computer program 1806. Once the computer program 1806 has the pointer to the IDataObject interface, the computer program 1806 then invokes UDT 1814 to transfer data contained within the object 1812.

While the present invention has been described with reference to a preferred embodiment thereof, those skilled in the art will note that various changes in form may be made without departing from the spirit and scope of the claimed invention as defined in the appended claims.

What is claimed is:

1. In a computer system, the computer system having a connection mechanism, a uniform data transfer mechanism, a memory, and a plurality of data transfer applications, each data transfer application having a plurality of computer programs, one computer program being a source and one computer program being a destination, the connection mechanism being a mechanism for establishing communication between the source and destination of a data transfer application and being application specific wherein the connection mechanism of a first data transfer application is not suitable for use by a second data transfer application, the uniform data transfer mechanism being separate from the communication mechanism, consisting of functions invocable by a computer program for transferring data after a connection has been established and suitable for use by all data transfer applications, a method in the computer system for transferring data comprising the steps of:

establishing a connection between the source and the destination using the connection mechanism; and invoking the uniform data transfer mechanism to transfer data from the source to the destination.

2. A method in a computer system for transferring data from a source computer program to a destination computer program, the source computer program having a programmatic interface containing function members that facilitate the transfer of the data, the method comprising:

the source computer program passing a reference to the programmatic interface from the source computer program to the destination computer program; and the destination computer program invoking the function members of the programmatic interface via the reference to transfer the data from the source computer program to the destination computer program.

3. The method of claim 2 wherein the computer system has a clipboard for performing a cut-and-paste operation wherein the data is cut from the source computer program in response to receiving a cut command from a user and the data is pasted into the destination computer program in response to receiving a paste command from the user, and wherein the source computer program passing a reference comprises:

receiving a cut command from the user;

storing the reference on the clipboard by the source computer program;

receiving a paste command from the user; and retrieving the reference from the clipboard by the destination computer program to facilitate the transfer of the data.

4. The method of claim 2 wherein the computer system has a display that displays a first window for the source computer program and that displays a second window for the destination computer program, has an input device that is manipulated by a user, and has a window manager for controlling the first window and the second window, wherein the first window contains a visual representation of the data, and wherein the source computer program passing a reference comprises:

selecting the visual representation of the data in the first window in response to user manipulation of the input device;

dragging the selected visual representation of the data from the first window to the second window in response to user manipulation of the input device; and dropping the dragged visual representation of the data into the second window in response to user manipulation of the input device whereupon the window manager passes the reference to the programmatic interface from the source computer program to the destination computer program.

5. A computer-readable medium whose contents cause data to be transferred from a source computer program to a destination computer program in a computer system, the source computer program having a programmatic interface containing function members that facilitate the transfer of the data, by:

the source computer program passing a reference to the programmatic interface from the source computer program to the destination computer program; and the destination computer program invoking the function members of the interface via the reference to transfer the data from the source computer program to the destination computer program.

6. The computer-readable medium of claim 5 wherein the computer system has a clipboard for performing a cut-and-paste operation wherein the data is cut from the source computer program in response to receiving a cut command from a user and the data is pasted into the destination computer program in response to receiving a paste command from the user, and wherein the source computer program passes a reference by:

receiving a cut command from the user;

storing the reference on the clipboard by the source computer program;

receiving a paste command from the user; and retrieving the reference from the clipboard by the destination computer program to facilitate the transfer of the data.

7. The computer-readable medium of claim 5 wherein the computer system has a display that displays a first window for the source computer program and that displays a second window for the destination computer program, has an input device that is manipulated by a user, and has a window manager for controlling the first window and the second window, wherein the first window contains a visual representation of the data, and wherein the source computer program passes a reference by:

selecting the visual representation of the data in the first window in response to user manipulation of the input device;

dragging the selected visual representation of the data from the first window to the second window in response to user manipulation of the input device; and dropping the dragged visual representation of the data into the second window in response to user manipulation of the input device whereupon the window manager passes the reference to the programmatic interface from the source computer program to the destination computer program.

* * * * *

UNITED STATES PATENT AND TRADEMARK OFFICE
CERTIFICATE OF CORRECTION

PATENT NO. : 6,721,951 B1
DATED : April 13, 2004
INVENTOR(S) : Williams et al.

It is certified that error appears in the above-identified patent and that said Letters Patent is hereby corrected as shown below:

Title page,
Item [63], Related U.S. Application Data, "now Pat. No. 5,911,066." should read
-- now Pat. No. 5,911,066, which is a Continuation of U.S. Application No. 08/199,853, filed on Feb. 22, 1994, now abandoned. --.

Column 1,
Line 34, "dam" should read -- data --.

Column 2,
Line 33, "10" should read -- 110 --.

Column 6,
Lines 34 and 41, "cfformat;" should read -- cfFormat; --.

Column 7,
Line 45, "contain" should read -- containing --.

Column 8,
Line 9, "MDataObject;" should read -- IDataObject: --.
Line 9, "[Unknown" should read -- IUnknown --.

Column 10,
Line 30, "(pformatetc, pmedium)" should read -- (pformatetcIn, pformatetcOut) --.

Column 11,
Line 15, ")wDirection," should read -- (wDirection, --.
Line 54, "pdwCoanection)" should read -- pdwConnection) --.

Column 12,
Line 5, "gradvf" should read -- grfAdvf --.
Line 16, "chanced" should read -- changed --.
Line 53, "(pdwCoanection)" should read -- (dwConnection) --.

Column 13,
Line 27, "chances," should read -- changes, --.
Line 32, "speckling" should read -- specifying --.
Line 34, "Next" should read -- Next, --.

UNITED STATES PATENT AND TRADEMARK OFFICE
CERTIFICATE OF CORRECTION

PATENT NO. : 6,721,951 B1
DATED : April 13, 2004
INVENTOR(S) : Williams et al.

It is certified that error appears in the above-identified patent and that said Letters Patent is hereby corrected as shown below:

Column 17,
Line 27, "script" should read -- script, --.

Signed and Sealed this

Thirteenth Day of July, 2004

JON W. DUDAS
*Acting Director of the United States Patent and Trademark Office*